(12) United States Patent
Iwata

(10) Patent No.: US 9,996,391 B2
(45) Date of Patent: *Jun. 12, 2018

(54) PARALLEL COMPUTER SYSTEM, METHOD OF CONTROLLING PARALLEL COMPUTER SYSTEM, AND RECORDING MEDIUM

(71) Applicant: FUJITSU LIMITED, Kawasaki-shi, Kanagawa (JP)

(72) Inventor: Akitaka Iwata, Ichinomiya (JP)

(73) Assignee: FUJITSU LIMITED, Kawasaki (JP)

( * ) Notice: Subject to any disclaimer, the term of this patent is extended or adjusted under 35 U.S.C. 154(b) by 148 days.

This patent is subject to a terminal disclaimer.

(21) Appl. No.: 15/206,385

(22) Filed: Jul. 11, 2016

(65) Prior Publication Data

US 2016/0321105 A1 Nov. 3, 2016

Related U.S. Application Data

(63) Continuation of application No. 14/321,861, filed on Jul. 2, 2014, now Pat. No. 9,454,399.

(30) Foreign Application Priority Data

Aug. 14, 2013 (JP) ................................ 2013-168743

(51) Int. Cl.
*G06F 9/48* (2006.01)
*G06F 9/50* (2006.01)

(52) U.S. Cl.
CPC .......... *G06F 9/4881* (2013.01); *G06F 9/4843* (2013.01); *G06F 9/505* (2013.01)

(58) Field of Classification Search
CPC ................................................... G06F 9/4881
See application file for complete search history.

(56) References Cited

U.S. PATENT DOCUMENTS

2006/0101104 A1    5/2006  Bhanot et al.
2008/0168163 A1*   7/2008  Kurokawa ............ G06F 9/5027
                                                        709/223
(Continued)

FOREIGN PATENT DOCUMENTS

JP    2008-516346    5/2008
JP    2011-053876    3/2011
(Continued)

OTHER PUBLICATIONS

Bergin, J., Data Structure Programming With the Standard Template Library in C++, 1994.
(Continued)

*Primary Examiner* — Charlie Sun
(74) *Attorney, Agent, or Firm* — Fujitsu Patent Center

(57) ABSTRACT

A management device includes: a memory; and a processor coupled to the memory. The processor executes a process including: storing therein an assignment table including first assignment information indicating whether a job is assigned to the information processing devices and second assignment information indicating that a job is constantly assigned to virtual information processing devices arranged at ends of a connection relation of the information processing devices; searching regions in which idle information processing devices assigned with no job are arranged continuously, using the assignment table stored at the storing; specifying a region appropriate for assignment of a job as an assignment target among the regions searched by the searching; and assigning the job as the assignment target to the region specified by the specifying.

8 Claims, 28 Drawing Sheets

(56) References Cited

U.S. PATENT DOCUMENTS

| | | | |
|---|---|---|---|
| 2009/0292787 A1 | 11/2009 | Hosokawa | |
| 2010/0153945 A1* | 6/2010 | Bansal | G06F 9/4881 718/1 |
| 2011/0213946 A1 | 9/2011 | Ajima et al. | |
| 2012/0017218 A1 | 1/2012 | Branson | |
| 2012/0304180 A1 | 11/2012 | Imade | |
| 2014/0245316 A1 | 8/2014 | Archer | |
| 2015/0007196 A1 | 1/2015 | Toll | |

FOREIGN PATENT DOCUMENTS

| | | |
|---|---|---|
| JP | 2012-243223 | 12/2012 |
| JP | 2012-252591 | 12/2012 |
| WO | 2008-114440 | 9/2008 |

OTHER PUBLICATIONS

European Office Action dated May 17, 2016 for corresponding European Patent Application No. 14175186.7, 4 pages.

Extended European Search Report dated Jan. 23, 2015 for corresponding European Patent Application No. 14175186.7, 6 pages.

Zydek, Dawid et al., "Fast and efficient processor allocation algorithm for torus-based chip multiprocessors," Oct. 7, 2010, XP028127932, Computers and Electrical Engineering, vol. 37, No. 1, pp. 91-105.

Bodzon, Bartosz et al., "Comparison of Allocation Algorithms in Mesh Oriented Structures for Different Scheduling Techniques," Nov. 28, 2012, XP047007661, Computational Collective Intelligence, pp. 223-232.

Bani-Mohammad, S. et al., "A Fast and Efficient Processor Allocation Strategy which Combines a Contiguous and Non-contiguous Processor Allocation Algorithms," Jan. 1, 2007, XP055116096, Retrieved from the Internet: URL: http://www.dcs.gla.ac.uklpublications/PAPERS/8354/TR-2007-229.pdf [retrieved on May 2, 2014], 20 pages.

USPTO, (Sun) Final Rejection, dated May 19, 2016, in parent U.S. Appl. No. 14/321,861 [pending].

USPTO, (Sun) Non-Final Rejection, dated Dec. 7, 2015, in parent U.S. Appl. No. 14/321,861 [pending].

\* cited by examiner

FIG.2

| (0, 0)=0, | (0, 1)=0, | (0, 2)=0, | (0, 3)=1 |
|---|---|---|---|
| (1, 0)=0, | (1, 1)=0, | (1, 2)=0, | (1, 3)=1 |
| (2, 0)=0, | (2, 1)=0, | (2, 2)=0, | (2, 3)=1 |
| (3, 0)=0, | (3, 1)=0, | (3, 2)=0, | (3, 3)=1 |
| (4, 0)=1, | (4, 1)=1, | (4, 2)=1, | (4, 3)=1 |

PARALLEL COMPUTER SYSTEM, METHOD OF CONTROLLING PARALLEL COMPUTER SYSTEM, AND RECORDING MEDIUM

CROSS-REFERENCE TO RELATED APPLICATION

This application is a continuation of application Ser. No. 14/321,861, filed Jul. 2, 2014, which is based upon and claims the benefit of priority of the prior Japanese Patent Application No. 2013-168743, filed on Aug. 14, 2013, the entire contents of which are incorporated herein by reference.

FIELD

The embodiments discussed herein are related to a parallel computer system, a control program for a management device, and a method of controlling the parallel computer system.

BACKGROUND

Conventionally known are parallel computer systems that connect computing nodes having an adjacent relation in an arbitrary-dimensional space with two-dimensional mesh connection, three-dimensional cube connection, torus connection, or the like, and cause another computing node located in a path to relay communication between computing nodes having no adjacent relation.

In the parallel computer systems, when one job is assigned to computing nodes that are not arranged continuously, a computing node assigned with another job relays communication between the computing nodes to which the job is assigned in some cases. In such a case, when the communication between the computing nodes to which the job is assigned causes disturbance for the computing node assigned with another job or abnormality is generated on the computing nodes that execute the job, another job is interrupted in some cases.

To address this, when the parallel computer system assigns a new job, it searches all regions in which idle nodes assigned with no job are continuous and selects an optimum region for execution of the job from the search regions. The parallel computer system then assigns the new job to the selected region.

The following describes an example of processing of searching all the regions as job assignment targets that is performed by the parallel computer system. In the following description, it is assumed that the parallel computer system has a two-dimensional mesh network in which four computing nodes are arranged in the X axial direction and three computing nodes are arranged in the Y axial direction and the adjacent computing nodes are connected.

For example, the parallel computer system selects one computing node and searches for the number of idle nodes continuous from the selected computing node in the Y axial direction while changing the number of computing nodes continuous therefrom in the X axial direction. Furthermore, the parallel computer system searches for the number of idle nodes continuous from the selected computing node in the X axial direction while changing the number of computing nodes continuous therefrom in the Y axial direction. The parallel computer system executes these pieces of processing for all the computing nodes so as to acquire pieces of search data indicating all the regions as the job assignment targets.

FIG. 28 is a view for explaining an example of the processing of searching the idle nodes. FIG. 28 illustrates pieces of search data that are acquired by the parallel computer system while they are grouped for respective computing nodes as origins of regions as job assignment targets when all the nodes included in the parallel computer system are the idle nodes. Among the pieces of search data as illustrated in FIG. 28, pieces of search data indicating regions that are the same as regions indicated by another search data are hatched as pieces of invalid data.

In the example illustrated in FIG. 28, when coordinates at which the computing node as the origin is arranged are expressed as (a, b), "e" as the number of idle nodes continuous in the Y axial direction that has been searched for "d" as the number of computing nodes in the X axial direction is expressed as T[a][b], xy[c]=(d, e). Furthermore, in the example illustrated in FIG. 28, "d" as the number of idle nodes continuous in the X axial direction that has been searched for "e" as the number of computing nodes in the Y axial direction is expressed as T[a][b], yx[c]=(d, e). It is noted that "c" is an array subscript for identifying search data.

For example, in the example illustrated in FIG. 28, the parallel computer system acquires (4, 3), (3, 3), (2, 3), (1, 3), (4, 3), (4, 2), and (4, 1) as pieces of search data indicating regions in which the computing node arranged at coordinates (0, 0) is set to the origin. That is to say, the parallel computer system acquires the pieces of search data indicating four regions having three computing nodes in the Y axial direction and one to four computing node(s) in the X axial direction and three regions having four computing nodes in the X axial direction and one to three computing node(s) in the Y axial direction.

In addition, the parallel computer system acquires pieces of search data indicating regions in which respective computing nodes are set to the origins for other computing nodes. Thereafter, the parallel computer system sorts the pieces of acquired search data in the descending order of the number of computing nodes included in the region. Thereafter, the parallel computer system selects search data indicating a minimum region satisfying the number of computing nodes as the job assignment targets from the pieces of sorted search data and assigns the job to the computing nodes included in the selected region.

Examples of the related techniques are described in Japanese Laid-open Patent Publication No. 2012-252591 and International Publication Pamphlet No. WO 2008/114440.

With the above-mentioned techniques of searching the regions as the job assignment targets, all the regions including the continuous idle nodes are searched. This causes a problem that the search cost is increased in accordance with the number of computing nodes.

Hereinafter, an example of processing of searching all the regions as the job assignment targets that is performed by the parallel computer system is described with reference to FIGS. 29 to 31. In the following example, the related parallel computer system searches rectangular regions including the continuous idle nodes.

First, the procedure of processing of selecting an information processing device that is set to an origin of a region is described with reference to FIG. 29. FIG. 29 is a first flowchart for explaining the procedure of related idle node search processing. In the example illustrated in FIG. 29, the parallel computer system initializes a Y value to "0" (step S1), and determines whether the Y value is smaller than 3 (step S2). If the Y value is smaller than 3 (Yes at step S2), the parallel computer system initializes an X value to "0" (step S3) and determines whether the X value is smaller than 4 (step S4).

If the X value is smaller than 4 (Yes at step S4), the parallel computer system executes Y-axis fixed search processing of searching the number of idle nodes continuous in the X axial direction while fixing the Y value (step S5). Thereafter, the parallel computer system executes X-axis fixed search processing of searching the number of idle nodes continuous in the Y axial direction while fixing the X value (step S6).

Subsequently, the parallel computer system adds 1 to the X value (step S7) and executes step S4. On the other hand, if the X value is equal to or larger than 4 (No at step S4), the parallel computer system adds 1 to the Y value (step S8) and executes step S2. Thereafter, if the Y value is equal to or larger than 3 (No at step S2), the parallel computer system finishes the processing.

Next, an example of the Y-axis fixed search processing is described with reference to FIG. 30. FIG. 30 is a second flowchart for explaining the procedure of the related idle node search processing. FIG. 30 illustrates the flowchart for explaining the procedure of the Y-axis fixed search processing at step S5 in FIG. 29.

For example, the parallel computer system initializes values of variables XMax, i, c, d, and e to set XMax=4−X, i=X, c=Y, d=0, and e=1 (step S10). The parallel computer system then determines whether the c value is smaller than 3 (step S11). If the c value is smaller than 3 (Yes at step S11), the parallel computer system determines whether the i value is smaller than 4 (step S12).

If the i value is smaller than 4 (Yes at step S12), the parallel computer system determines whether the i value is smaller than the XMax value (step S13). If the i value is smaller than the XMax value (Yes at step S13), the parallel computer system determines whether a computing node T[i][c] arranged at coordinates (i, c) is an idle node (step S14). If the computing node T[i][c] is the idle node (Yes at step S14), the parallel computer system adds 1 to each of the d and i values (step S15) and executes step S12.

On the other hand, if the i value is equal to or larger than 4 (No at step S12), if the i value is equal to or larger than XMax (No at step S13), or if T[i][c] is not the idle node (No at step S14), the parallel computer system executes the following processing. That is, the parallel computer system outputs (d, e) as search data T[X][Y]yx[c] and sets XMax=d, and then, initializes the i and d values to set i=X and d=0, and adds 1 to each of the c and e values (step S16). Subsequently, the parallel computer system executes step S11. If the c value is equal to or larger than 3 (No at step S11), the parallel computer system finishes the Y-axis fixed search processing.

Next, an example of the X-axis fixed search processing is described with reference to FIG. 31. FIG. 31 is a third flowchart for explaining the procedure of the related idle node search processing. FIG. 31 illustrates the flowchart for explaining the procedure of the X-axis fixed search processing at step S6 in FIG. 29.

For example, the parallel computer system initializes values of the variables YMax, i, c, d, and e to set YMax=3−Y, i=Y, c=X, d=1, and e=0 (step S20). The parallel computer system then determines whether the c value is smaller than 4 (step S21). If the c value is smaller than 4 (Yes at step S21), the parallel computer system determines whether the i value is smaller than 3 (step S22).

If the i value is smaller than 3 (Yes at step S22), the parallel computer system determines whether the i value is smaller than YMax (step S23). If the i value is smaller than YMax (Yes at step S23), the parallel computer system determines whether a computing node T[c][i] arranged at coordinates (c, i) is the idle node (step S24). If the computing node T[c][i] is the idle node (Yes at step S24), the parallel computer system adds 1 to each of the e and i values (step S25) and executes step S22.

On the other hand, if the i value is equal to or larger than 3 (No at step S22), if the i value is equal to or larger than YMax (No at step S23), or if T[c][i] is not the idle node (No at step S24), the parallel computer system executes the following processing. That is, the parallel computer system outputs (d, e) as search data T[X][Y]xy[c] and sets YMax=e, and then, initializes the i and e values to set i=Y, e=0, and adds 1 to each of the c and d values (step S26). Subsequently, the parallel computer system executes step S21. If the c value is equal to or larger than 4 (No at step S21), the parallel computer system finishes the X-axis fixed search processing.

When the parallel computer system searches the regions as the job assignment targets in the above-mentioned manner, the parallel computer system executes condition determination processing included in the Y-axis fixed search processing and the X-axis fixed search processing repeatedly. For this reason, the number of times of the condition determination processing that the parallel computer system executes is increased as the number of computing nodes is increased. Due to this, the parallel computer system is incapable of completing the process within practical time in some cases.

SUMMARY

According to an aspect of the embodiments, a parallel computer system includes: a parallel computing device including a plurality of information processing devices connected to one another; and a management device managing the parallel computing device. The management device includes: a memory; and a processor coupled to the memory. The processor executes a process including: storing therein an assignment table including first assignment information indicating whether a job is assigned to the information processing devices and second assignment information indicating that a job is constantly assigned to virtual information processing devices arranged at ends of a connection relation of the information processing devices; searching regions in which idle information processing devices assigned with no job are arranged continuously, using the assignment table stored at the storing; specifying a region appropriate for assignment of a job as an assignment target among the regions searched by the searching; and assigning the job as the assignment target to the region specified by the specifying.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a view for explaining an example of a node table that is generated by a management device in the first embodiment;

DESCRIPTION OF EMBODIMENTS

Preferred embodiments will be explained with reference to accompanying drawings. The disclosed technique is not limited by the following embodiments. Furthermore, the embodiments may be combined appropriately within a range where the combined embodiment is consistent with the embodiments.

[a] First Embodiment

Figure 1:
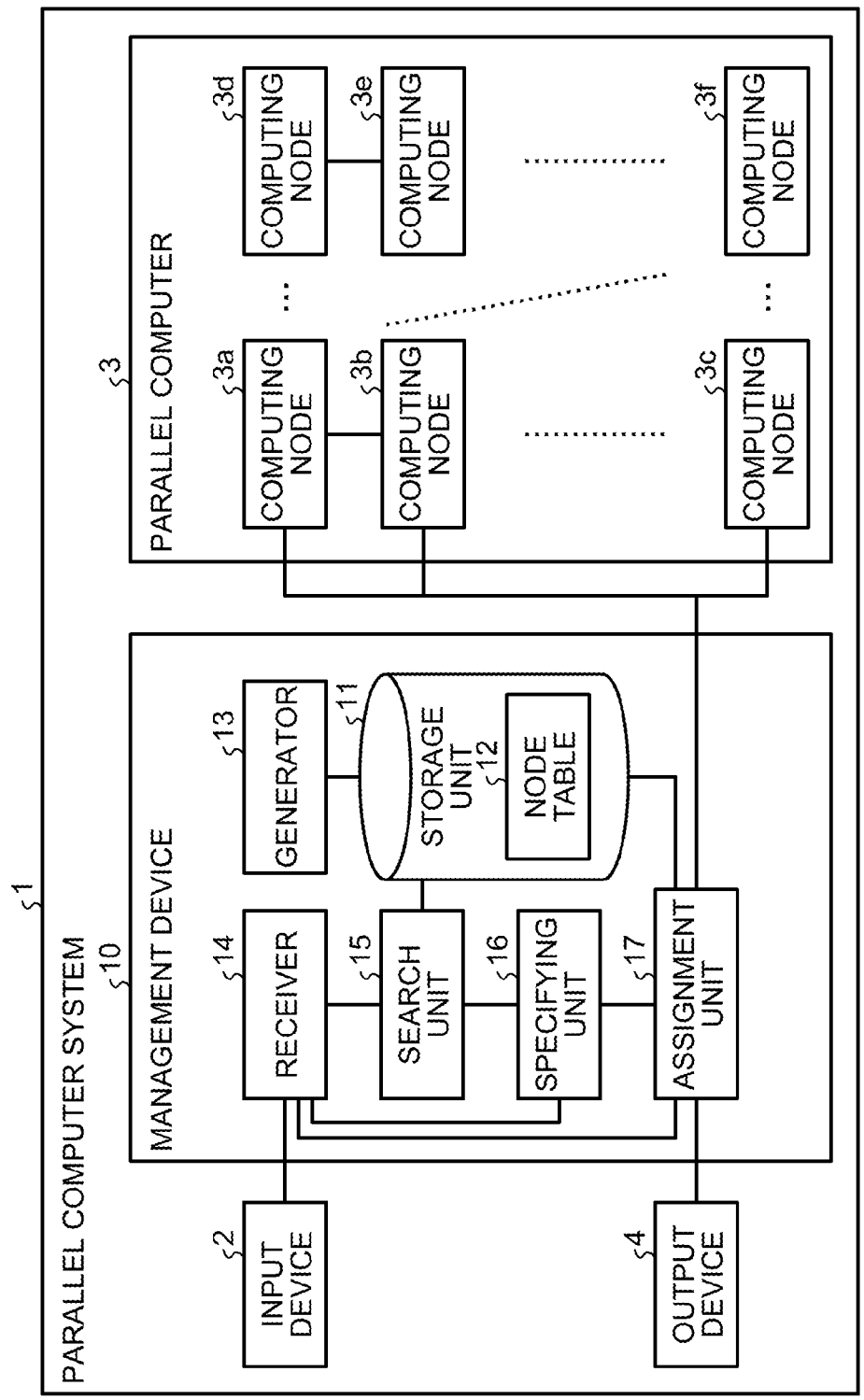
FIG. 1 is a diagram for explaining a parallel computer system according to a first embodiment.

In the following first embodiment, an example of a parallel computer system according to the present application is described with reference to FIG. 1. FIG. 1 is a diagram for explaining the parallel computer system in the first embodiment. In the example illustrated in FIG. 1, a parallel computer system 1 includes an input device 2, a parallel computer 3, an output device 4, and a management device 10.

The input device 2 is an input device for inputting a job that is executed by the parallel computer system 1. For example, the input device 2 outputs contents of the job that is input by a user of the parallel computer system 1 to the management device 10. Furthermore, when the input device 2 receives input of the number or topology of computing nodes as job assignment targets, the input device 2 notifies the management device 10 of the number or the topology of computing nodes that has been received. For example, the input device 2 receives information "(2, 3)" indicating six computing nodes in total of three in the Y axial direction and two in the X axial direction that have been connected in a mesh form as the topology of the computing nodes as the job assignment targets. In this case, the input device 2 notifies the management device 10 of the received information "(2, 3)" together with the job to be assigned.

The parallel computer 3 includes a plurality of computing nodes 3a to 3f. The parallel computer 3 includes a plurality of computing nodes in addition to the computing nodes 3a to 3f illustrated in FIG. 1. In the following description, the computing nodes 3b to 3f exhibit the same functions as those of the computing node 3a and description thereof is omitted.

The computing node 3a is an information processing device that executes various pieces of information processing. A central processing unit (CPU), a micro processing unit (MPU), a graphic processing unit (GPU), an application specific integrated circuit (ASIC), or the like is employed as the computing node 3a as an example. The computing node 3a may be an information processing device including a plurality of CPUs or the like, a memory, and an input/output (I/O).

The respective computing nodes 3a to 3f are connected in a two-dimensional mesh form and make communication between the connected computing nodes. For example, the computing nodes 3a to 3f form a two-dimensional mesh network in which four computing nodes are arranged in each X axial direction and three computing nodes are arranged in each Y axial direction and adjacent computing nodes are connected. For example, when the computing node 3a makes data communication with the computing node 3c that is not connected directly to the computing node 3a, it makes data communication with the computing node 3c through the computing node 3b or other computing nodes.

In the following description, among the computing nodes that are connected in the two-dimensional mesh form, the computing node arranged at an end point is set to an origin and the coordinates at which the respective computing nodes 3a to 3f are arranged are expressed using the number of computing nodes from the origin in the respective axial directions. That is to say, the parallel computer system 1 sets a connection distance to the coordinates at which each computing node is arranged. The connection distance indicates the number of computing nodes that are connected in the respective axial directions from the computing node as the origin. For example, the computing node that is distanced from the computing node as the origin by d computing nodes in the X axial direction and e computing nodes in the Y axial direction corresponds to the computing node arranged at coordinates (d, e). Furthermore, in the following description, it is assumed that the parallel computer 3 has a network in which twelve computing nodes in total of three in the X axial direction and four in the Y axial direction are connected in the two-dimensional mesh form.

On the other hand, the management device 10 includes a storage unit 11, a generator 13, a receiver 14, a search unit 15, a specifying unit 16, and an assignment unit 17. The storage unit 11 stores therein a node table 12.

The node table 12 is a table storing therein information indicating whether a job is assigned to the respective computing nodes 3a to 3f. The following describes an example of the node table 12 with reference to FIG. 2. FIG. 2 is a view for explaining an example of the node table that is generated by the management device in the first embodiment.

For example, as illustrated in FIG. 2, the node table 12 stores therein coordinates of the respective computing nodes and valid bits indicating whether a job is assigned to the respective computing nodes. For example, the node table 12 stores therein "(0, 0)=0" indicating that no job is assigned to the computing node at the origin. Furthermore, the node table 12 stores therein "(0, 1)=0", "(0, 2)=0", "(1, 0)=0", "(1, 1)=0", and "(1, 2)=0" indicating the coordinates and the valid bits of the respective computing nodes. In addition, the node table 12 stores therein "(2, 0)=0", "(2, 1)=0", "(2, 2)=0", "(3, 0)=0", "(3, 1)=0", and "(3, 2)=0".

As indicated by dotted lines in FIG. 2, the node table 12 stores therein coordinates of virtual computing nodes arranged at termination ends of the network formed by the computing nodes 3a to 3f and valid bits indicating that a job is constantly assigned to the virtual computing nodes. To be specific, the node table 12 stores therein "(0, 3)=1", "(1, 3)=1", "(2, 3)=1", "(3, 3)=1", "(4, 0)=1", "(4, 1)=1", "(4, 2)=1", and "(4, 3)=1". In the following description, computing nodes that are virtual, are arranged at the termination ends of the network, and are constantly assigned with the job are referred to as virtual computing nodes.

Description is continued with reference to FIG. 1, again. The generator 13 generates the node table 12. To be specific, the generator 13 generates information in which the coordinates of the computing nodes 3a to 3f and the valid bits indicating whether a job is assigned to the computing nodes are made to correspond to each other. The generator 13 further generates the coordinates of the virtual computing nodes arranged at the termination ends of the network formed by the computing nodes 3a to 3f, and generates information in which the valid bits indicating that the job is assigned are made to correspond to the generated coordinates. Furthermore, the generator 13 stores the pieces of generated information as the node table 12 in the storage unit 11.

The receiver 14 receives the job to be assigned and the number or the topology of computing nodes as the job assignment targets from the input device 2. In this case, the receiver 14 requests the search unit 15 to search regions in which idle nodes as computing nodes assigned with no job are continuous and notifies the specifying unit 16 of the number or the topology of computing nodes that has been received. In addition, the receiver 14 outputs the received job to the assignment unit 17.

The search unit 15 searches all the regions in which the idle nodes are arranged continuously, using the node table 12 generated by the generator 13. To be specific, the search unit 15 selects the computing node included in the parallel computer 3 sequentially and executes X-axis fixed search processing of counting the number of idle nodes continuous from the selected computing node as a base point in the Y axial direction while changing the connection distance therefrom in the X axial direction. Furthermore, the search unit 15 executes Y-axis fixed search processing of counting the number of idle nodes continuous from the selected computing node as the base point in the X axial direction while changing the connection distance therefrom in the Y axial direction.

As a result of the X-axis fixed search processing and the Y-axis fixed search processing, the search unit 15 outputs, as search data, the size of a region in which the idle nodes are continuous in the X axial direction and the Y axial direction while setting the selected computing node as the base point. The following describes the Y-axis fixed search processing and the X-axis fixed search processing that are executed by the search unit 15. In the following description, the search unit 15 searches rectangular regions for making assignment of the job easily.

Figure 3:
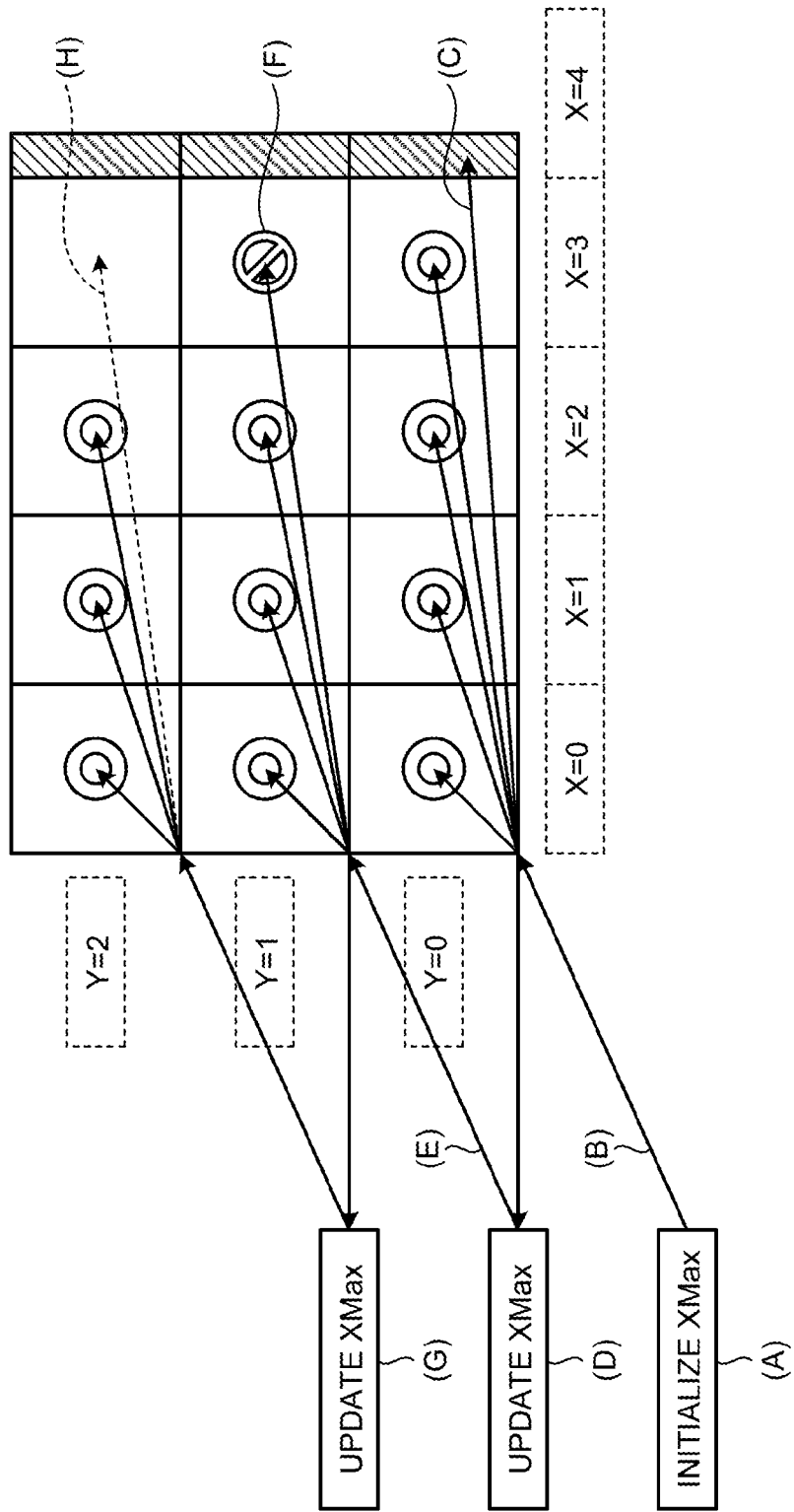
FIG. 3 is a view for explaining Y-axis fixed search processing that is executed by the management device in the first embodiment.

First, the Y-axis fixed search processing that is executed by the search unit 15 is described with reference to FIG. 3. FIG. 3 is a view for explaining the Y-axis fixed search processing that is executed by the management device in the first embodiment. FIG. 3 illustrates contents of the Y-axis fixed search processing that is executed by the search unit 15 when the computing node arranged at coordinates (0, 0) is set to the base point. In the example illustrated in FIG. 3, it is assumed that a job is assigned to the computing node arranged at coordinates (3, 1).

First, as indicated by (A) in FIG. 3, the search unit 15 initializes XMax as a maximum value of the number of computing nodes in the X axial direction that are included in a region to be searched. For example, the search unit 15 sets XMax to "4" as the number of computing nodes to the virtual computing nodes at the termination end in the X axial direction. Thereafter, as indicated by (B) in FIG. 3, the search unit 15 determines whether the job is assigned to the computing nodes from the computing node arranged at the coordinates (0, 0) to the computing node of which the connection distance in the X axial direction is the same as Xmax, that is, the computing node arranged at coordinates (4, 0) sequentially.

Meanwhile, in the related parallel computer system, every time it is determined whether the computing node as a determination target is the idle node, it is determined whether processing of determining whether the computing node is the idle node has been executed for all the computing nodes continuous in the X axial direction. When the processing is executed, the number of times of the determination processing is increased as the number of computing nodes included in the parallel computer 3 is increased.

On the other hand, in the parallel computer system 1, the node table 12 includes pieces of data of the virtual computing nodes constantly assigned with the job. With this configuration, the search unit 15 can search the region in which the idle nodes are continuous appropriately simply by determining whether the respective computing nodes are the idle nodes without determining whether the processing of determining whether the computing node is the idle node has been executed for all the computing nodes continuous in the X axial direction.

For example, in the example illustrated in FIG. 3, the search unit 15 determines whether the computing node is the idle node for the computing nodes from the computing node at the coordinates (0, 0) to the computing node at the coordinates (3, 0) sequentially. After the search unit 15 determines whether the computing node at the coordinates (3, 0) is the idle node, it determines whether the job is assigned to the computing node at the coordinates (4, 0), that is, the virtual computing node, as indicated by (C) in FIG. 3. As a result of this, the search unit 15 determines that the job is assigned to the computing node at the coordinates (4, 0). The search unit 15 also determines that "4" computing nodes from the computing node at the coordinates (0, 0) to the computing node at the coordinates (3, 0) are the idle nodes.

Consequently, the search unit 15 determines that the searching processing in the X axial direction when the connection distance in the Y axial direction is set to "1" has been completed. Thereafter, the search unit 15 outputs T[0][0], yx[0]=(4, 1) as search data of a first region in the Y-axis fixed search when the coordinates (0, 0) are set to the base point. T[0][0], yx[0]=(4, 1) indicates the region in which the number of idle nodes in the X axial direction is "4" and the number of idle nodes in the Y axial direction is "1". In this manner, the search unit 15 can determine whether the search processing in the X axial direction has been completed without determining whether the determination processing to the computing node at the termination end in the X axial direction has been executed.

Thereafter, as indicated by (D) in FIG. 3, the search unit 15 updates the XMax value to "4" as the number of continuous idle nodes. Subsequently, as indicated by (E) in FIG. 3, the search unit 15 selects the computing node that is connected to the computing node at the base point in the Y axial direction, that is, the computing node arranged at coordinates (0, 1). The search unit 15 also determines whether the job is assigned to the computing nodes from the computing node arranged at the coordinates (0, 1) to the computer node distanced therefrom by the number of computing nodes that is the same as XMax, in other words, the computing node arranged at coordinates (3, 1) sequentially.

In this case, as indicated by (F) in FIG. 3, the job is assigned to the computing node arranged at the coordinates (3, 1). Based on this, the search unit 15 determines that the number of continuous idle nodes is "3" when the coordinates (0, 0) are set to the base point and the size in the Y axial direction is set to "2". As a result, the search unit 15 outputs T[0][0], yx[1]=(3, 2) as search data of a second region when the coordinates (0, 0) are set to the base point.

Thereafter, as indicated by (G) in FIG. 3, the search unit 15 updates the XMax value to "3" as the number of continuous idle nodes. The search unit 15 also selects the computing node that is connected to the computing node selected previously in the Y axial direction, that is, the computing node arranged at coordinates (0, 2). The search unit 15 also determines whether the job is assigned to the computing nodes from the computing node arranged at the coordinates (0, 2) to the computer node distanced therefrom in the X axial direction by the number of computing nodes that is the same as XMax, in other words, the computing node arranged at coordinates (2, 2) sequentially.

In the example illustrated in FIG. 3, no job is assigned to the computing node arranged at the coordinates (0, 2) to the computing node arranged at the coordinates (2, 2). In this case, the search unit 15 determines that the number of continuous idle nodes is "3" when the coordinates (0, 0) are set to the base point and the size in the Y axial direction is set to "3". As a result, the search unit 15 outputs T[0][0], yx[2]=(3, 3) as search data of a third region when the coordinates (0, 0) are set to the base point.

As illustrated in FIG. 3, when the job is assigned to the computing node arranged at the coordinates (3, 1), a region of which the connection distance from the computing node at the base point is (3, 3) is a maximum rectangular region in which the computing nodes assigned with no job are continuous. When the job is assigned to the computing node at the coordinates (3, 1), processing of determining whether the job is assigned to the computing node at the coordinates (3, 2) is useless processing.

For this reason, the search unit 15 stores, as XMax, the minimum value among the numbers of idle nodes continuous in the respective X axial directions in the Y-axis fixed search processing. The search unit 15 also determines whether the job is assigned to only the computing node of which the connection distance is the same as the stored XMax when the size in the Y axial direction is changed. For example, as indicated by (H) in FIG. 3, the search unit 15 does not execute the processing of determining whether the job is assigned to the computing node arranged at coordinates (3, 2). This enables the search unit 15 to eliminate useless determination in the Y-axis fixed search processing when the search unit 15 searches the rectangular region.

Figure 4:
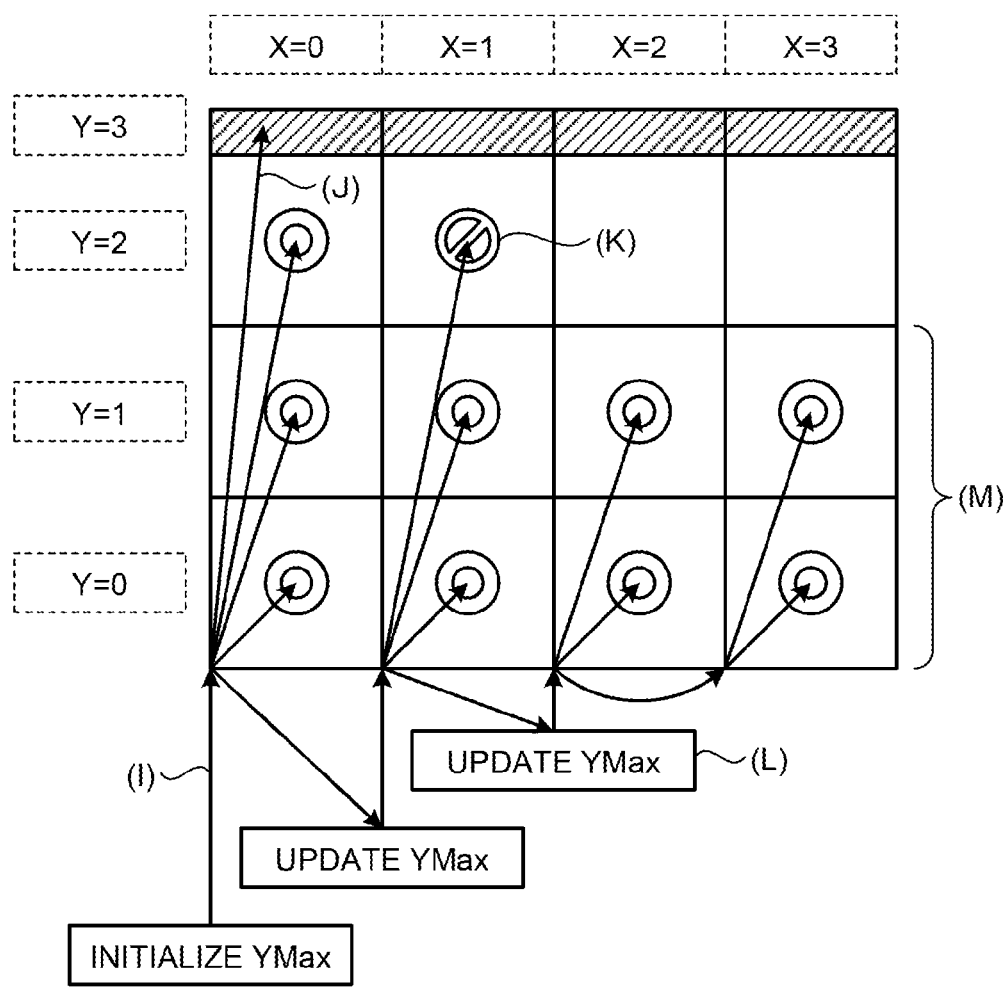
FIG. 4 is a view for explaining X-axis fixed search processing that is executed by the management device in the first embodiment.

Next, the X-axis fixed search processing that is executed by the search unit 15 is described with reference to FIG. 4. FIG. 4 is a view for explaining the X-axis fixed search processing that is executed by the management device in the first embodiment. FIG. 4 illustrates contents of the X-axis fixed search processing that is executed by the search unit 15 when the computing node arranged at the coordinates (0, 0) is set to the base point. In the example illustrated in FIG. 4, it is assumed that a job is assigned to the computing node arranged at coordinates (1, 2).

First, the search unit 15 initializes YMax as a maximum value of the number of computing nodes in the Y axial direction that are included in a region to be searched. For example, the search unit 15 sets YMax to "3" as the number of computing nodes to the virtual computing nodes at the termination end in the Y axial direction. Thereafter, as indicated by (I) in FIG. 4, the search unit 15 determines whether the job is assigned to the computing nodes from the computing node arranged at the coordinates (0, 0) to the computing node of which the connection distance in the Y axial direction is the same as Ymax, that is, the computing node arranged at coordinates (0, 3) sequentially.

In the example illustrated in FIG. 4, the search unit 15 determines whether the computing node is the idle node for the computing nodes from the computing node at the coordinates (0, 0) to the computing node at coordinates (0, 2) sequentially. After the search unit 15 determines whether the computing node at the coordinates (0, 2) is the idle node, it determines whether the job is assigned to the computing node at the coordinates (0, 3), that is, the virtual computing node, as indicated by (J) in FIG. 4.

As a result of this, the search unit 15 determines that the job is assigned to the computing node at the coordinates (0, 3). The search unit 15 also determines that "3" computing nodes from the computing node arranged at the coordinates (0, 0) to the computing node arranged at the coordinates (0, 2) are the idle nodes. As a result, the search unit 15 outputs T[0][0], xy[0]=(1, 3) as search data of a first region in the X-axis fixed search when the coordinates (0, 0) are set to the base point. T[0][0], xy[0]=(1, 3) indicates the region of which the connection distance in the Y axial direction is "3" and the connection distance in the X axial direction is "1".

Thereafter, the search unit 15 updates the YMax value to "3" as the number of continuous idle nodes. The search unit 15 also selects the computing node that is connected to the computing node at the base point in the X axial direction, that is, the computing node arranged at coordinates (1, 0). The search unit 15 also determines whether the job is assigned to the computing nodes from the computing node arranged at the coordinates (1, 0) to the computer node distanced therefrom by the number of computing nodes that is the same as Ymax, in other words, the computing node arranged at coordinates (1, 2) sequentially.

In this case, as indicated by (K) in FIG. 4, the job is assigned to the computing node arranged at the coordinates (1, 2). Based on this, the search unit 15 determines that the number of continuous idle nodes is "2" when the coordinates (0, 0) are set to the base point and the size in the X axial direction is set to "2". As a result, the search unit 15 outputs T[0][0], xy[1]=(2, 2) as search data of a second region when the coordinates (0, 0) are set to the base point.

Thereafter, as indicated by (L) in FIG. 4, the search unit 15 updates the YMax value to "2" as the number of continuous idle nodes. The search unit 15 also selects the computing node that is connected to the computing node selected previously in the X axial direction, that is, the computing node arranged at coordinates (2, 0). Thereafter, as indicated by (M) in FIG. 4, the search unit 15 determines whether the job is assigned to the computing nodes from the computing node arranged at the coordinates (2, 0) to the computer node connected thereto in the Y axial direction and distanced therefrom by the number of computing nodes that is the same as Ymax, in other words, the computing node arranged at coordinates (2, 1) sequentially.

In the example illustrated in FIG. 4, no job is assigned to the computing node arranged at the coordinates (2, 0) to the computing node arranged at the coordinates (2, 1). In this case, the search unit 15 determines that the number of continuous idle nodes is "2" when the coordinates (0, 0) are set to the base point and the size in the X axial direction is "3". As a result, the search unit 15 outputs T[0][0], xy[2]=(3, 2) as search data of a third region when the coordinates (0, 0) are set to the base point.

Thereafter, the search unit 15 updates the YMax value to "2" as the number of continuous idle nodes. The search unit 15 also selects the computing node that is connected to the computing node selected previously in the X axial direction, that is, the computing node arranged at coordinates (3, 0). Thereafter, as indicated by (M) in FIG. 4, the search unit 15 determines whether the job is assigned to the computing nodes from the computing node arranged at the coordinates (3, 0) to the computer node connected thereto in the Y axial direction and distanced therefrom by the number of computing nodes that is the same as Ymax, in other words, the computing node arranged at the coordinates (3, 1) sequentially.

Based on this, the search unit 15 determines that the number of continuous idle nodes is "2" when the coordinates (0, 0) are set to the base point and the magnitude in the X axial direction is "4". As a result, the search unit 15 outputs T[0][0], xy[2]=(4, 2) as search data of a fourth region when the coordinates (0, 0) are set to the base point.

In this manner, the search unit 15 searches for the regions in which the idle nodes are continuous using the node table 12 indicating that the virtual computing nodes constantly assigned with the job are arranged at the termination ends of the network formed by the computing nodes 3a to 3f. This enables the search unit 15 to eliminate the processing of determining whether determination whether the computing node is the idle node has been executed for the computing nodes from the computing node at the base point to the computing nodes at the termination ends in the respective axial directions. As a result, the search unit 15 can reduce the number of times of determination of the processing of searching the regions in which the idle nodes are continuous.

The search unit 15 counts the number of idle nodes continuous from the computing node at the base point in the predetermined axial direction. When the search unit 15 changes the number of computing nodes continuous in the direction other than the predetermined axial direction and counts the number of idle nodes continuous in the predetermined axial direction, the search unit 15 determines whether the computing node is the idle node for the computing nodes by the number of computing nodes that is the same as the number of idle nodes continuous in the predetermined axial direction counted before. This enables the search unit 15 to further reduce the number of times of determination of the processing of searching the regions in which the idle nodes are continuous.

Description is continued with reference to FIG. 1, again. The specifying unit 16 specifies a region appropriate for the job assignment among the regions searched by the search unit. For example, the specifying unit 16 receives the number or the topology of computing nodes included in the region as the job assignment target from the receiver 14. Furthermore, the specifying unit 16 receives pieces of search data indicating all the regions searched by the search unit 15.

In this case, the specifying unit 16 sorts the received pieces of search data by the number of computing nodes included in each region. Thereafter, the specifying unit 16 determines whether the search data satisfies the number or the topology of computing nodes received from the receiver 14 in the order from the search data of which the number of computing nodes included in the region is smaller among the pieces of sorted search data. Thereafter, when the specifying unit 16 determines that the search data satisfies the number or the topology of computing nodes received from the receiver 14, the specifying unit 16 outputs the search data to the assignment unit 17.

Figure 5:
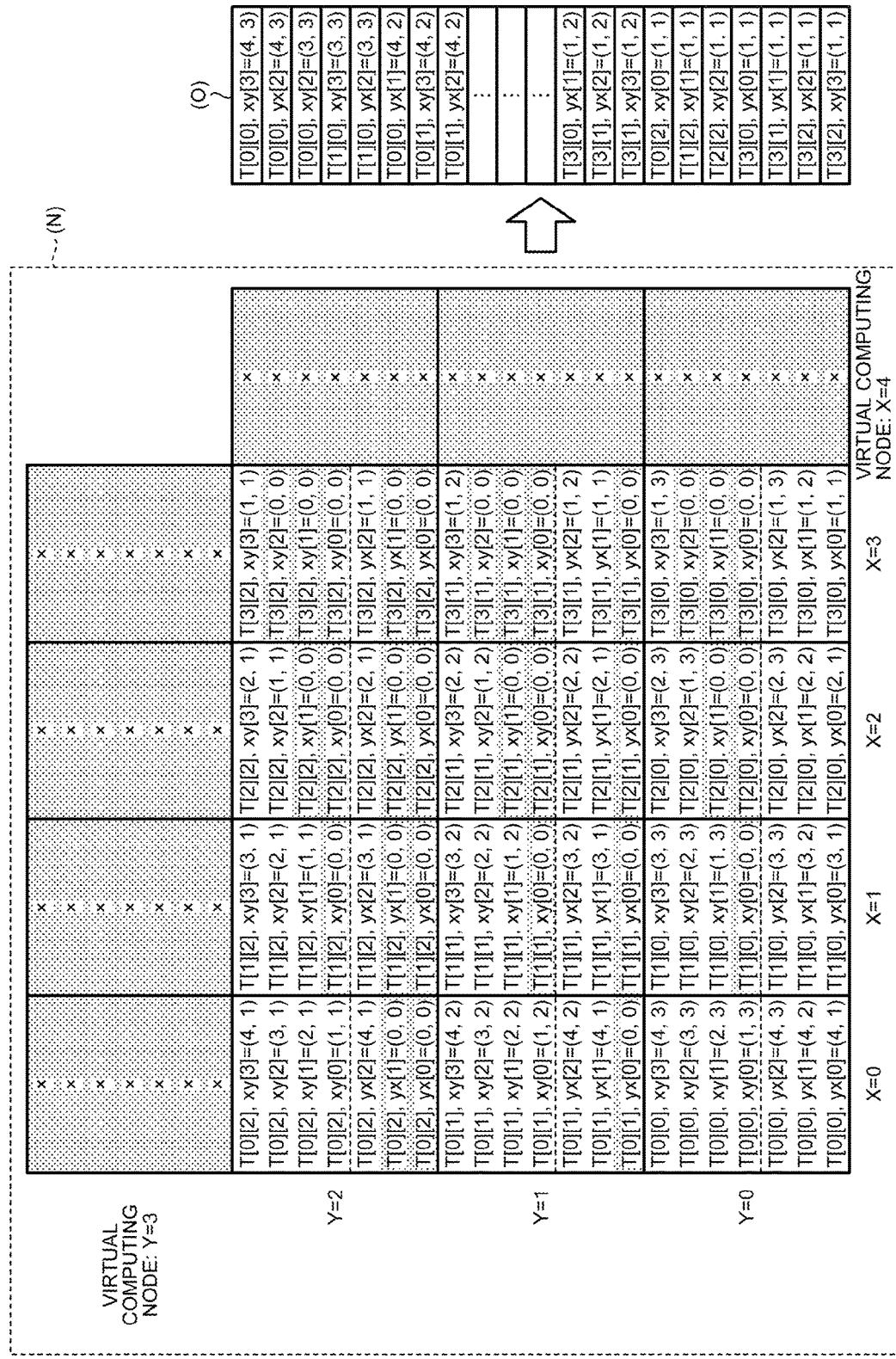
FIG. 5 is a view for explaining an example of processing of specifying idle regions that is performed by the management device in the first embodiment.

For example, FIG. 5 is a view for explaining an example of processing of specifying an idle region that is performed by the management device in the first embodiment. In FIG. 5, the pieces of search data acquired from the search unit 15 when all the computing nodes 3a to 3f included in the parallel computer 3 are the idle nodes are illustrated while being grouped for the respective computing nodes at the base points. Among the pieces of search data as illustrated in FIG. 5, pieces of search data indicating regions that are the same as regions indicated by another search data are hatched as pieces of invalid data.

For example, the specifying unit 16 acquires pieces of search data as indicated by (N) in FIG. 5. In this case, as indicated by (O) in FIG. 5, the specifying unit 16 sorts the pieces of search data by the number of computing nodes included in each region. Thereafter, the specifying unit 16 determines whether the search data is search data indicating a region identical to the number or the topology of nodes received from the receiver 14 in the order from the lowest-order data among the pieces of sorted search data. For example, when the specifying unit 16 receives topology (3, 2) from the receiver 14, the specifying unit 16 searches search data indicating that the size of the region is (3, 2) in the order from the lowest-order data. Thereafter, the specifying unit 16 outputs the specified search data to the assignment unit 17.

The processing that is executed by the specifying unit 16 is not limited to the above-mentioned processing. For example, when there are a plurality of pieces of search data indicating regions identical to the number or the topology of nodes received from the receiver 14, the specifying unit 16 may select search data indicating a region as the job assignment target such that a space in which the idle nodes are continuous after the job assignment becomes the largest.

Figure 6:
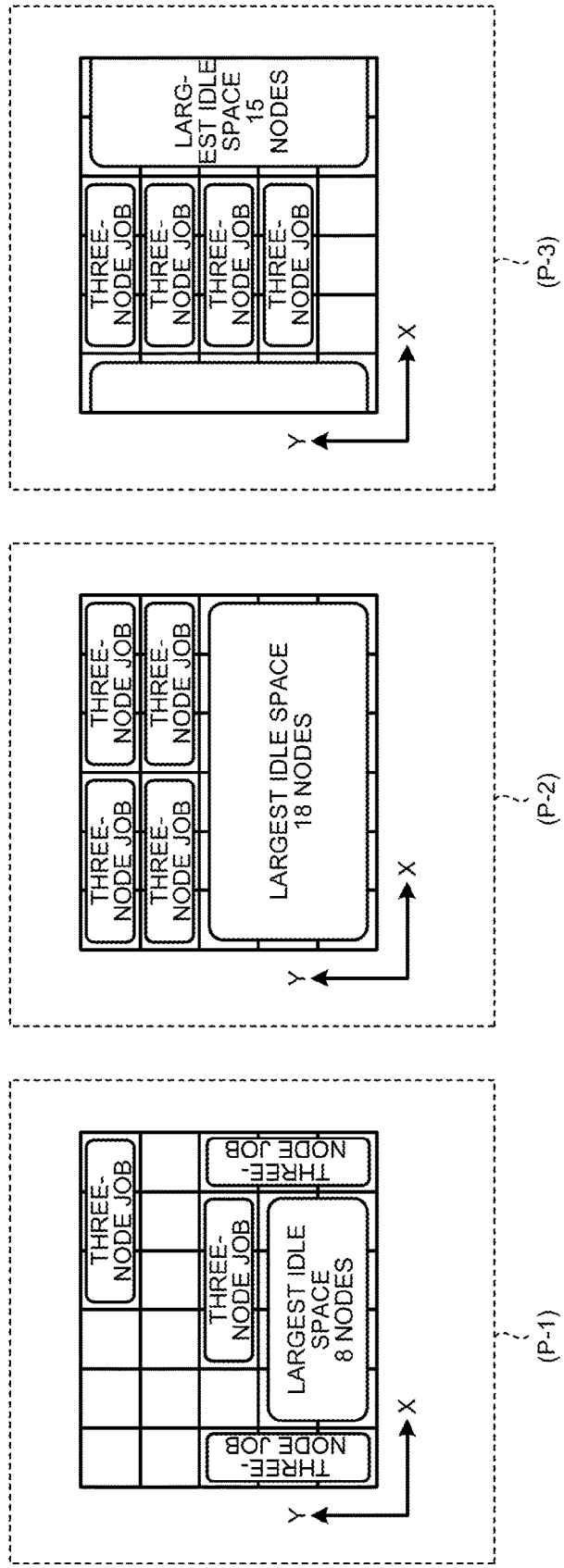
FIG. 6 is a view for explaining processing of selecting search data from a list such that a space in which idle nodes are continuous is the largest.

For example, FIG. 6 is a view for explaining processing of selecting the search data from a list such that the space in which the idle nodes are continuous becomes the largest. FIG. 6 illustrates an example in which a plurality of three-node jobs each using three nodes are assigned to a network formed by six computing nodes arranged in the X axial direction and five computing nodes arranged in the Y axial direction.

As indicated by (P-1) in FIG. 6, when four three-node jobs are arranged randomly, the management device 10 limits the largest idle space as the largest region in which the idle nodes are continuous to be a space formed by eight nodes, for example. On the other hand, as indicated by (P-2) in FIG. 6, when four three-node jobs are assigned to the nodes from the ends of the network continuously, the management device 10 can expand the largest idle space to a space formed by eighteen nodes.

In view of this, when there are the plurality of pieces of search data indicating regions identical to the number or the topology of nodes received from the receiver 14, the specifying unit 16 executes the following processing. In the following description, the search data indicating the region identical to the number or the topology of nodes received from the receiver 14 is referred to as identical data. First, when there are the plurality of pieces of identical data, the specifying unit 16 specifies, for each identical data, search data indicating a region that is higher-order than the identical data and becomes incapable of being used when the job is assigned to the identical data among the pieces of sorted search data.

The specifying unit 16 specifies identical data for which the size of the region indicated by the specified search data is the smallest and notifies the assignment unit 17 of the specified identical data. The above-mentioned processing enables the specifying unit 16 to eliminate fragmentation of the region as the job assignment target so as to assign the job efficiently.

Description is continued with reference to FIG. 1, again. The assignment unit 17 assigns the job to the region specified by the specifying unit 16. For example, the assignment unit 17 receives the job from the receiver 14. Furthermore, the assignment unit 17 receives the search data indicating the region as the job assignment target from the specifying unit 16. In this case, the assignment unit 17 assigns the job received from the receiver 14 to the computing nodes included in the region indicated by the search data. The assignment unit 17 updates the valid bits of the computing nodes assigned with the job to "1" among the valid bits of the respective computing nodes that are stored in the node table 12.

When execution of the job is completed, the assignment unit 17 receives job execution results from the computing nodes that have completely executed the job and outputs the received job execution results to the output device 4. The assignment unit 17 updates the valid bits related to the computing nodes that have completely executed the job to "0" among the valid bits of the respective computing nodes that are stored in the node table 12.

When the computing nodes 3a to 3f form a two-dimensional torus network, a region as the job assignment target can be specified by executing the following processing. For example, when the computing nodes 3a to 3f form the two-dimensional torus network coming around in the X axial direction, the generator 13 selects computing nodes of which the coordinates in the Y axial direction are "0" sequentially. Thereafter, the generator 13 generates the node table 12 indicating that the computing nodes 3a to 3f form the two-dimensional mesh network in which the selected computing node is set to a virtual origin for each of the selected computing nodes. In other words, the generator 13 generates the node table 12 in which each computing node having the coordinate of "0" in the Y axial direction is set to the virtual origin.

The search unit 15 selects the computing nodes of which the coordinates in the Y axial direction are "0" as the virtual origins sequentially, and executes the above-mentioned search processing using the node table 12 corresponding to each of the selected virtual origins. As a result of this, the search unit 15 generates the pieces of search data as indicated by (N) in FIG. 5 for the number of virtual origins. Thereafter, the specifying unit 16 specifies a region that is optimum for the job assignment using all pieces of search data generated by the search unit 15.

For example, when the computing nodes 3a to 3f form the two-dimensional torus network coming around in the X axial direction, the specifying unit 16 takes the largest idle space node coming around in the X axial direction as indicated by (P-3) in FIG. 6 into consideration. Based on this, the specifying unit 16 may arrange four three-node jobs so as to be aligned in the Y axial direction.

Figure 29:
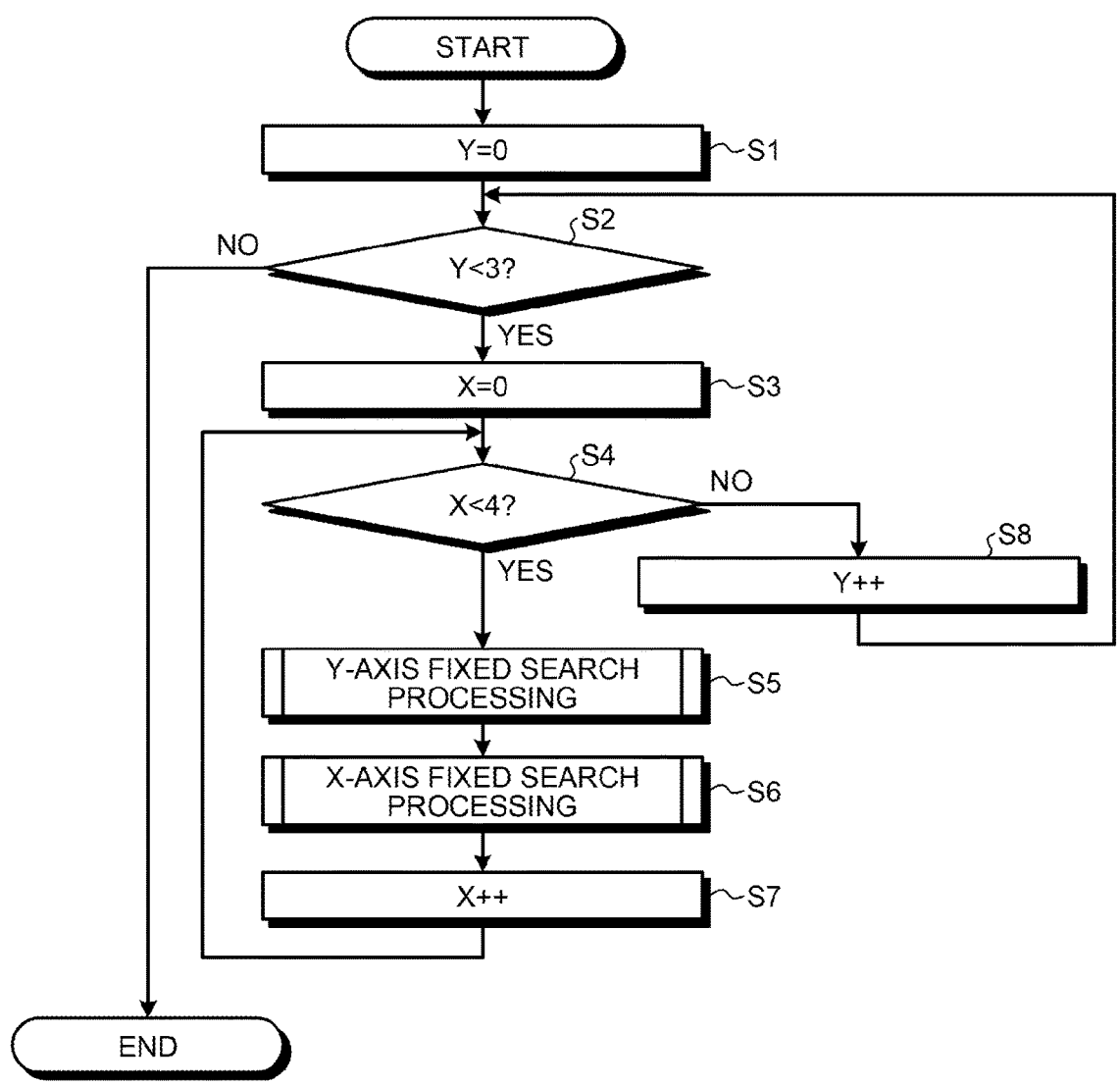
FIG. 29 is a first flowchart for explaining the procedure of related idle node search processing.

Next, the procedure of the processing that is executed by the management device 10 is described. The management device 10 executes the main processing of selecting the computing node at the base point of a region, the X-axis fixed search processing, and the Y-axis fixed search processing. The main processing that is executed by the management device 10 is the same as the processing that is executed by the related parallel computer system as illustrated in FIG. 29, and description thereof is omitted.

Figure 7:
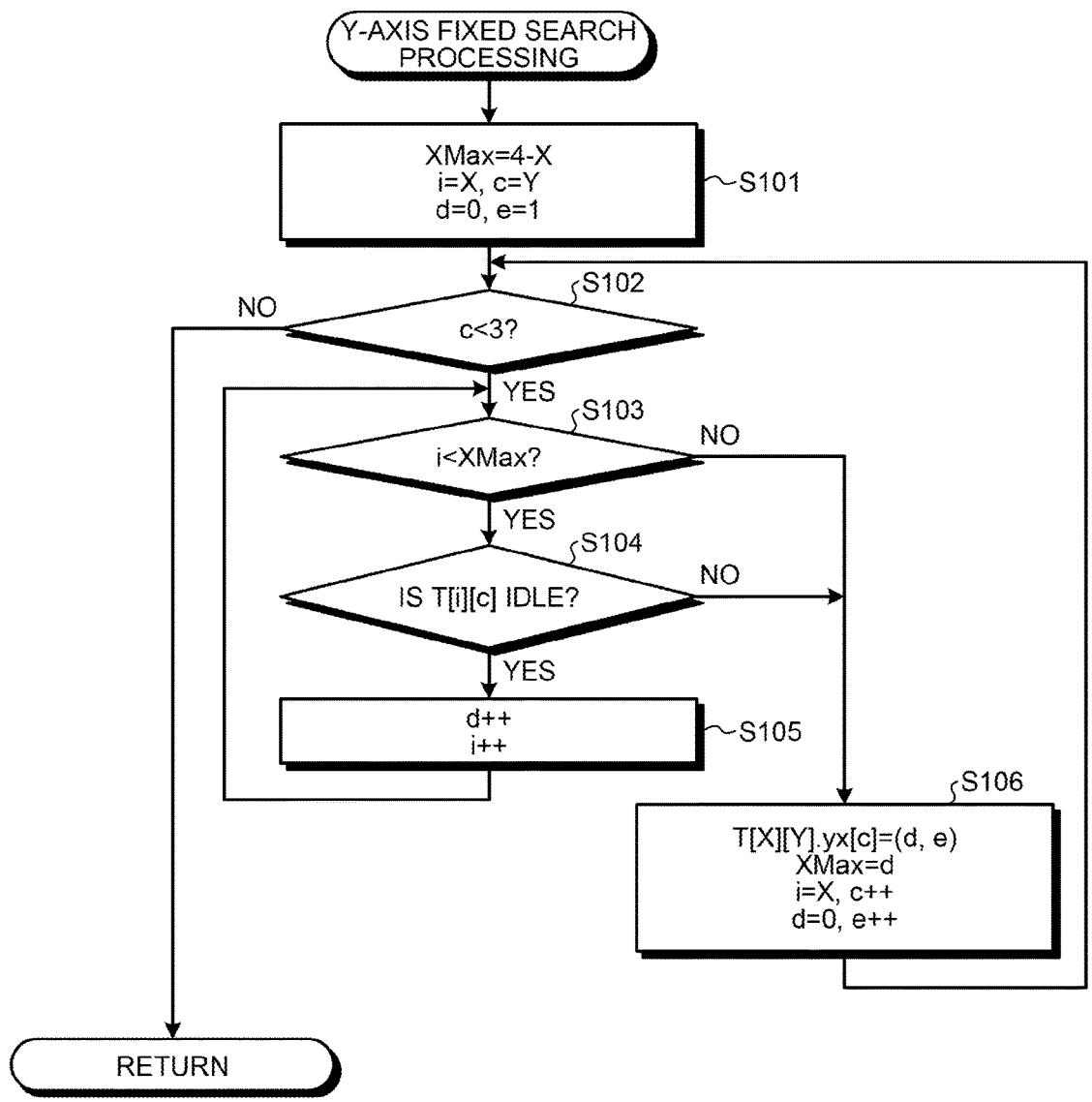
FIG. 7 is a flowchart for explaining the procedure of the Y-axis fixed search processing that is executed by the management device in the first embodiment.

First, the procedure of the Y-axis fixed search processing that is executed by a management device 10 is described with reference to FIG. 7. FIG. 7 is a flowchart for explaining the procedure of the Y-axis fixed search processing that is executed by the management device in the first embodiment. For example, the management device 10 initializes values of the variables XMax, i, c, d, and e to set XMax=4−X, i=X, c=Y, d=0, and e=1 (step S101). The management device 10 then determines whether the c value is smaller than 3 (step S102). If the c value is smaller than 3 (Yes at step S102), the parallel computer system determines whether the i value is smaller than XMax (step S103).

When the i value is smaller than XMax (Yes at step S103), the parallel computer system determines whether a computing node T[i][c] arranged at coordinates (i, c) is the idle node (step S104). If the computing node T[i][c] is the idle node (Yes at step S104), the parallel computer system adds 1 to each of the d and i values (step S105) and executes step S103.

On the other hand, if the i value is equal to or larger than XMax (No at step S103) or when T[i][c] is not the idle node (No at step S104), the parallel computer system executes the following processing. That is, the parallel computer system outputs (d, e) as search data T[X][Y]yx[c] and sets XMax=d. Thereafter, the parallel computer system initializes the i and d values to set i=X and d=0, and adds 1 to each of the c and e values (step S106). Thereafter, the parallel computer system executes step S102. If the c value is equal to or larger than 3 (No at step S102), the parallel computer system finishes the Y-axis fixed search processing.

Figure 8:
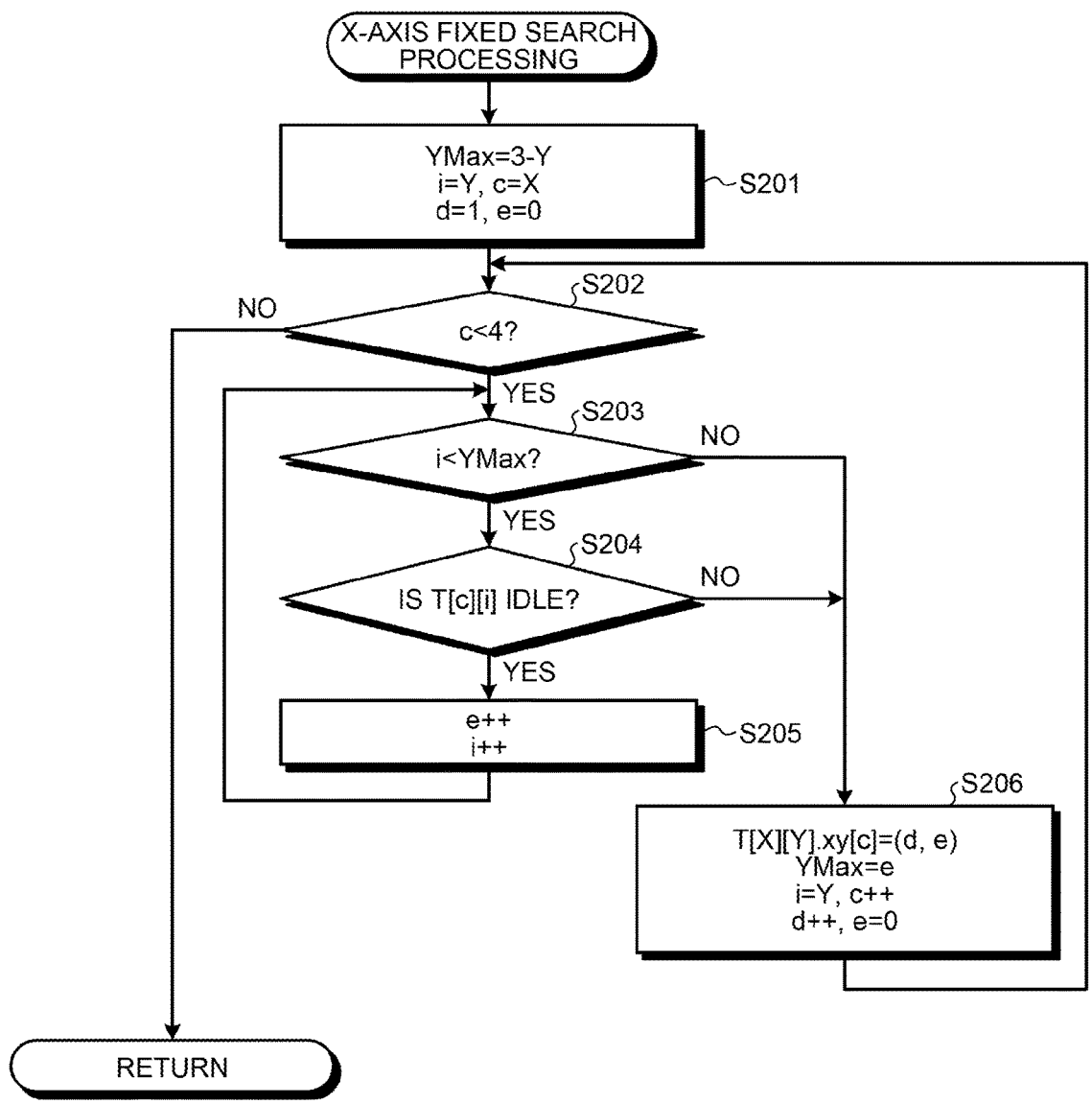
FIG. 8 is a flowchart for explaining the procedure of the X-axis fixed search processing that is executed by the management device in the first embodiment.

Next, an example of the X-axis fixed search processing is described with reference to FIG. 8. FIG. 8 is a flowchart for explaining the procedure of the X-axis fixed search processing that is executed by the management device in the first embodiment. For example, the parallel computer system initializes values of the variables YMax, i, c, d, and e to set YMax=3−Y, i=Y, c=X, d=1, and e=0 (step S201). The parallel computer system then determines whether the c value is smaller than 4 (step S202). If the c value is smaller than 4 (Yes at step S202), the parallel computer system determines whether the i value is smaller than YMax (step S203). When the i value is smaller than YMax (Yes at step S203), the parallel computer system determines whether a computing node T[c][i] arranged at coordinates (c, i) is the idle node (step S204). If the computing node T[c][i] is the idle node (Yes at step S204), the parallel computer system adds 1 to each of the e and i values (step S205) and executes step S203.

On the other hand, if the i value is equal to or larger than YMax (No at step S203) or when T[c][i] is not the idle node (No at step S204), the parallel computer system executes the following processing. That is, the parallel computer system outputs (d, e) as search data T[X][Y]xy[c] and sets YMax=e. Thereafter, the parallel computer system initializes the i and e values to set i=Y, e=0, and adds 1 to each of the c and d values (step S206). The parallel computer system then executes step S202. If the c value is equal to or larger than 4 (No at step S202), the parallel computer system finishes the Y-axis fixed search processing.

Advantageous Effects of Parallel Computer System 1

As described above, the parallel computer system 1 includes the parallel computer 3 having the plurality of computing nodes 3a to 3f and the management device 10 managing the parallel computer 3. The computing nodes 3a to 3f are connected to the computing nodes 3a to 3f. Furthermore, the management device 10 stores therein the node table 12 including first information and second information. The first information indicates whether a job is assigned to the respective computing nodes 3a to 3f. The second information indicates that a job is constantly assigned to the virtual computing nodes arranged at the termination ends of the connection relations of the computing nodes 3a to 3f.

The management device 10 searches all the regions in which the idle nodes are continuous, using the node table 12. Thereafter, the management device 10 specifies a region appropriate for assignment of a job as an assignment target from the search regions and assigns the job as the assignment target to the specified region. This enables the parallel computer system 1 to eliminate termination end determination processing when the regions in which the idle nodes are continuous are searched. As a result, the parallel computer system 1 can reduce the processing cost when searching the regions in which the idle nodes are continuous and shorten the time taken for the search.

The management device 10 selects the computing node at the base point of the region and counts the number of continuous idle nodes from the selected computing node in the predetermined axial direction (for example, X axial direction) while changing the number of computing nodes continuous in the axial direction (for example, Y axial direction) other than the predetermined axial direction. Thereafter, the management device 10 searches all the regions in which the selected computing node is set to the base point using the counted result. With this configuration, the management device 10 can search all the regions in which the idle nodes are continuous.

When the management device 10 changes the number of computing nodes continuous in the axial direction other than the predetermined axial direction and counts the number of idle nodes continuous in the predetermined axial direction, the management device 10 sets the minimum value of the number of continuous idle nodes counted before to the maximum value of the number of idle nodes to be counted newly. This enables the management device 10 to eliminate the processing of determining whether the computing node is the idle node for the computing nodes that are not included in the region, thereby shortening the time taken for the search.

[b] Second Embodiment

The following second embodiment describes a parallel computer system 1a that further reduces the processing cost when the regions in which idle nodes are included continuously are searched. In the following description, the same reference numerals denote components exhibiting the same functions as those in the first embodiment described above and description thereof is omitted below.

Figure 9:
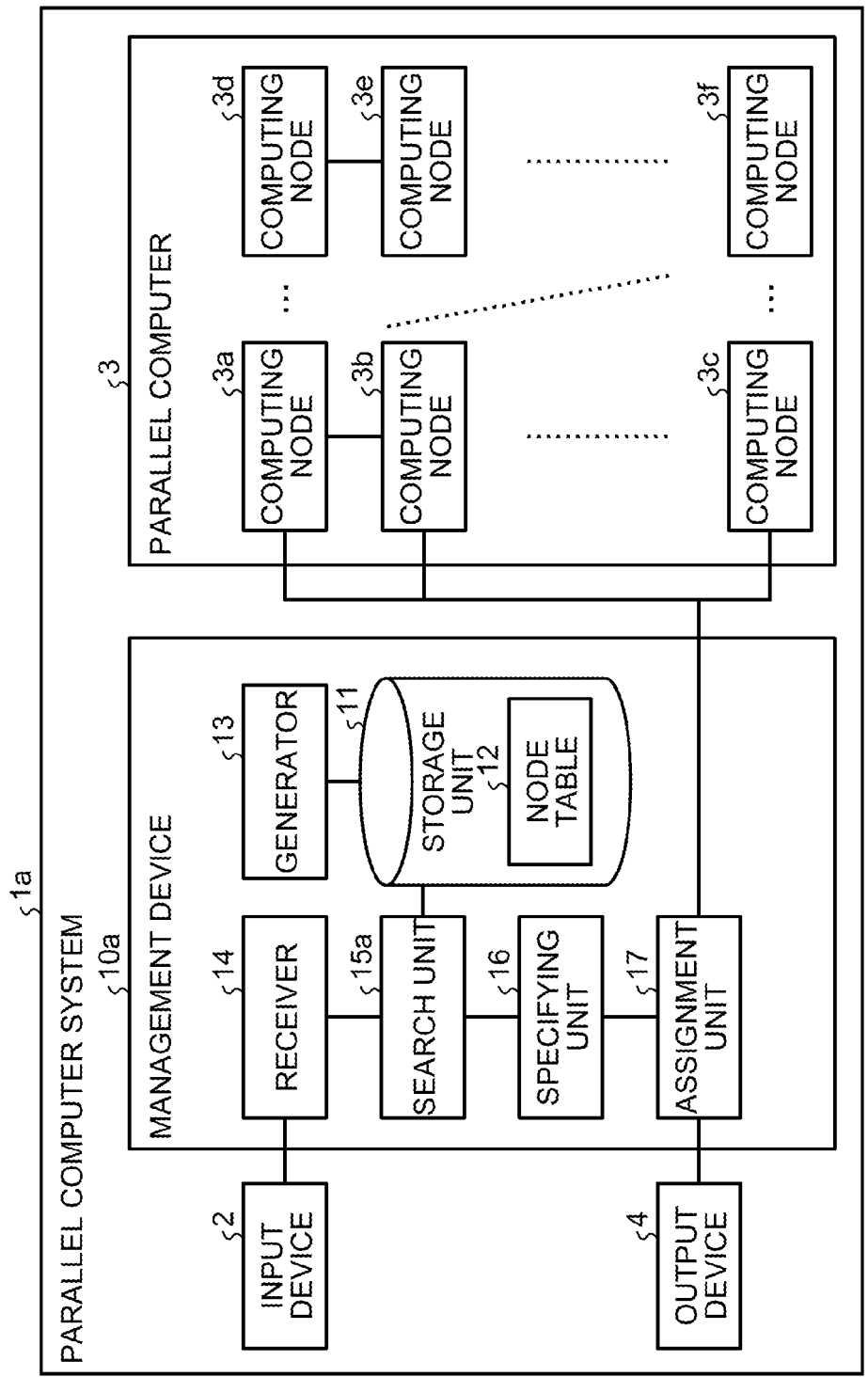
FIG. 9 is a diagram for explaining a parallel computer system according to a second embodiment.

FIG. 9 is a diagram for explaining the parallel computer system in the second embodiment. As illustrated in FIG. 9, the parallel computer system 1a includes the input device 2, the output device 4, the parallel computer 3, and a management device 10a. The management device 10a includes the storage unit 11 storing therein the node table 12, the generator 13, the receiver 14, a search unit 15a, the specifying unit 16, and the assignment unit 17.

The search unit 15a searches regions in which the idle nodes are continuous as in the search unit 15. The search unit 15a executes selection processing of selecting a computing node and calculation processing of calculating a region in which the computing node selected by the selection processing is set to the base point for the respective axial directions in order to reduce the processing cost when the search processing is executed.

First, the selection processing that is executed by the search unit 15a is described. The search unit 15a specifies a computing node of which the connection distance from the computing node at the origin is the maximum, that is, the computing node of which the connection distances of the arranged coordinates in the respective axial directions are the maximum. Thereafter, the search unit 15a sequentially selects computing nodes that are connected at the negative side in the predetermined axial direction, that is, at the side of the computing node at the origin from the specified computing node.

After the search unit 15a selects all the computing nodes that are connected at the negative side in the predetermined axial direction from the specified computing node, the search unit 15a specifies a computing node that is connected to the specified computing node at the negative side in the axial direction other than the predetermined axial direction. The search unit 15a also selects all computing nodes that are connected at the negative side in the predetermined axial direction from the specified computing node. The search unit 15a repeats the above-mentioned selection processing for the respective axial directions. With this configuration, the search unit 15a selects all the nodes from the computing node of which the connection distances of the coordinates in the respective axial directions are maximum to the computing node arranged at the origin one by one.

For example, when the search unit 15a executes the selection processing for the X axial direction, the search unit 15a selects computing nodes from the computing node arranged at the coordinates (3, 2) to the computing node arranged at the coordinates (0, 2) sequentially. After the search unit 15a selects the computing nodes from the computing node arranged at the coordinates (3, 2) to the computing node arranged at the coordinates (0, 2) sequentially, the search unit 15a selects computing nodes from the computing node arranged at the coordinates (3, 1) to the computing node arranged at the coordinates (0, 1) sequentially. After the search unit 15a selects the computing nodes from the computing node arranged at the coordinates (3, 1) to the computing node arranged at the coordinates (0, 1) sequentially, the search unit 15a selects computing nodes from the computing node arranged at the coordinates (3, 0) to the computing node arranged at the coordinates (0, 0) sequentially.

When the search unit 15a executes the selection processing for the Y axial direction, the search unit 15a selects computing nodes from the computing node arranged at the coordinates (3, 2) to the computing node arranged at the coordinates (3, 0) sequentially. Subsequently, the search unit 15a selects computing nodes from the computing node arranged at the coordinates (2, 2) to the computing node arranged at the coordinates (2, 0) sequentially, and then, selects computing nodes from the computing node arranged at the coordinates (1, 2) to the computing node arranged at the coordinates (1, 0) sequentially. Thereafter, the search unit 15a selects computing nodes from the computing node arranged at the coordinates (0, 2) to the computing node arranged at the coordinates (0, 0) sequentially.

Next, the calculation processing that is executed by the search unit 15a for the respective axial directions is described. First, the search unit 15a determines whether a job is assigned to the computing node selected by the selection processing using the node table 12. When no job is assigned to the selected computing node, the search unit 15a specifies another computing node that is connected to the selected computing node and of which the connection distance in any axial direction is larger than that of the selected computing node.

The search unit 15a calculates search data indicating a region in which the selected computing node is set to the base point from search data indicating a region in which the specified computing node is set to the base point. On the other hand, when the job is assigned to the selected computing node, the search unit 15a sets the number of continuous idle nodes from the computing node to "0" so as to calculate invalidated search data.

For example, when the management device 10a searches idle nodes at the positive sides in the respective axes directions from the computing node at the base point, a region in which the computing node arranged at the coordinates (2, 1) is set to the base point includes a region in which the coordinates (3, 1) are set to the base point and a region in which the coordinates (2, 2) are set to the base point. In view of this, the search unit 15a selects the computing node in the order from the computing node of which the connection distance from the origin is larger by the above-mentioned selection processing and calculates a region in which the selected computing node is set to the base point from a search result obtained before. This reduces the processing cost of the search processing.

The following describes the processing of calculating the search data indicating the region in which the selected computing node is set to the base point from the search data indicating the region in which the computing node specified by the search unit 15a is set to the base point that is executed by the search unit 15a. First, the Y-axis fixed search processing as one of the pieces of processing of calculating the search data that is executed by the search unit 15a is described.

For example, the search unit 15a selects a computing node at the negative side in the X axial direction starting from the computing node arranged at the coordinates (3, 2) sequentially. When no job is assigned to the selected computing node, the search unit 15a sets the selected computing node to the base point and searches the size of the region in the X axial direction while changing the size thereof in the Y axial direction. For one computing node, the size of a region in the X axial direction of which the size in the Y axial direction is 1 is a value obtained by adding 1 to the size of a region in the X axial direction of which the size in the Y axial direction is 1 among regions in which a computing node that is connected to the computing node at the positive side in the X axial direction is set to the base point.

Based on this, when the search unit 15a calculates search data indicating a region of which the size in the Y axial direction is 1 for the selected computing node, the search unit 15a executes the following processing. First, the search unit 15a specifies search data indicating a region of which the size in the Y axial direction is 1 among pieces of search data indicating regions in which the computing node that is connected to the selected computing node at the positive side in the X axial direction is set to the base point. Thereafter, the search unit 15a outputs a value obtained by adding 1 to the size of the specified search data in the X axial direction as the search data indicating the region in which the selected computing node is set to the base point and of which the size in the Y axial direction is 1.

Furthermore, for one computing node, the size of a region in the X axial direction of which the size in the Y axial direction is an integer n of equal to or larger than 2 satisfies the following conditions. First, the size of the region in the X axial direction is equal to or smaller than a value (hereinafter, referred to as a first value) obtained by adding 1 to the size of a region in the X axial direction of which the size in the Y axial direction is n among regions in which a computing node that is connected to the computing node at the base point at the positive side in the X axial direction is set to the base point. Moreover, the size of the region in the X axial direction is equal to or smaller than a value (hereinafter, referred to as a second value) of the size of a region in the X axial direction of which the size in the Y axial direction is n−1 among regions in which a computing node that is connected to the computing node at the base point at the positive side in the Y axial direction is set to the base point. In consideration of this, the search unit 15a selects a smaller value from the first value and the second value. Thereafter, the search unit 15a outputs search data of which the size in the Y axial direction is n and size in the X axial direction is the selected value.

Subsequently, the X-axis fixed search processing as one of the pieces of processing of calculating the search data that is executed by the search unit 15a is described. For example, the search unit 15a selects a computing node at the negative side in the Y axial direction starting from the computing node arranged at the coordinates (3, 2) sequentially. When no job is assigned to the selected computing node, the search unit 15a sets the selected computing node to the base point and searches the size of the region in the Y axial direction while changing the size thereof in the X axial direction.

For one computing node, the size of a region in the Y axial direction of which the size in the X axial direction is 1 is a value obtained by adding 1 to the size of a region in the Y axial direction of which the size in the X axial direction is 1 among regions in which a computing node that is connected to the computing node at the positive side in the Y axial direction is set to the base point. Based on this, the search unit 15a specifies search data indicating a region of which the size in the X axial direction is 1 among pieces of search data indicating regions in which a computing node that is connected to the selected computing node at the positive side in the Y axial direction is set to the base point. The search unit 15a then outputs a value obtained by adding 1 to the size of the specified search data in the Y axial direction as the search data indicating the region in which the selected computing node is set to the base point and of which the size in the X axial direction is 1.

Furthermore, for one computing node, the size of a region in the Y axial direction of which the size in the X axial direction is an integer n of equal to or larger than 2 satisfies the following conditions. First, the size of the region in the Y axial direction is equal to or smaller than a value (hereinafter, referred to as a third value) of the size of a region in the Y axial direction of which the size in the X axial direction is n−1 among regions in which a computing node that is connected to the computing node at the base point at the positive side in the X axial direction is set to the base point. Moreover, the size of the region in the Y axial direction is equal to or smaller than a value (hereinafter, referred to as a fourth value) obtained by adding 1 to the size of a region in the Y axial direction of which the size in the X axial direction is n among regions in which a computing node that is connected to the computing node at the base point at the positive side in the Y axial direction is set to the base point. In consideration of this, the search unit 15a selects a smaller value from the third value and the fourth value. The search unit 15a then outputs search data of which the size in the X axial direction is n and size in the Y axial direction is the selected value.

Figure 10:
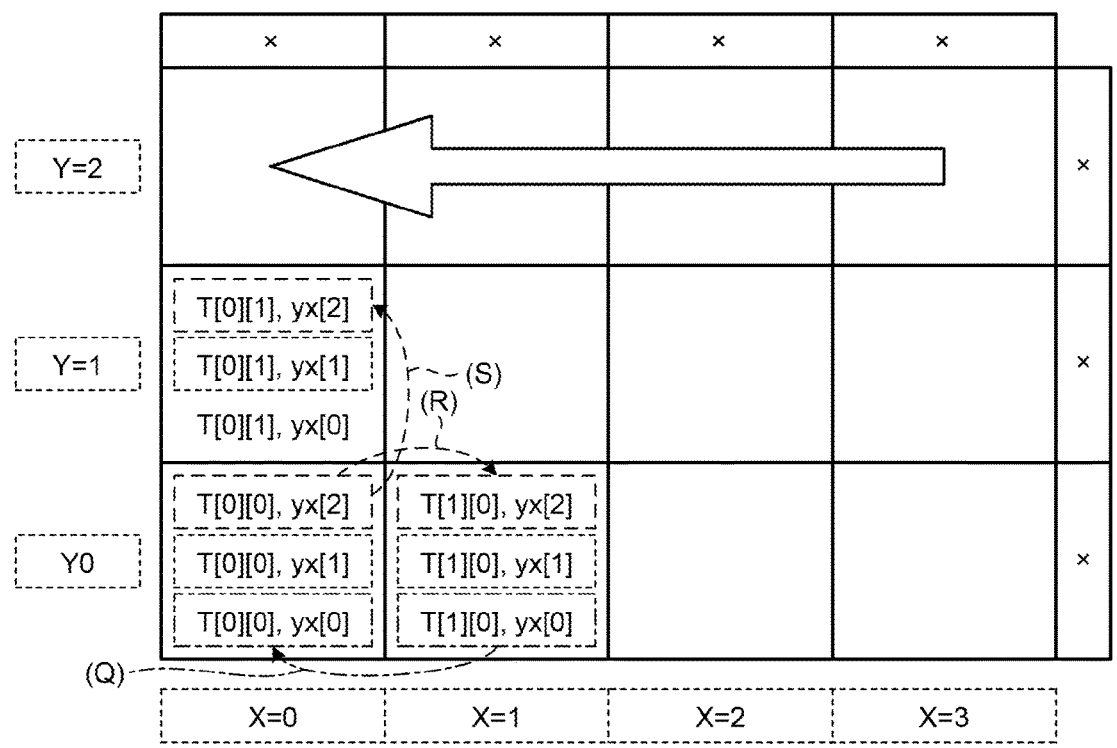
FIG. 10 is a view for explaining the procedure of processing that is executed for the X axial direction by a management device in the second embodiment.

Hereinafter, an example of the processing that is executed by the search unit 15a is described with reference to FIG. 10 and FIG. 11. First, an example of the calculation processing that is executed for the X axial direction by the search unit 15a is described with reference to FIG. 10. FIG. 10 is a view for explaining the procedure of the processing that is executed for the X axial direction by the management device in the second embodiment. FIG. 10 illustrates an example where the search unit 15a calculates search data indicating a region in which the computing node arranged at the coordinates (0, 0) is set to the base point.

For example, when the search unit 15a searches search data T[0][0], yx[0] indicating a region of which the size in the Y axial direction is "1" among regions in which the computing node arranged at the coordinates (0, 0) is set to the base point, the search unit 15a executes the following processing. First, the search unit 15a refers to a value of search data T[1][0], yx[0] indicating a region of which the size in the Y axial direction is "1" among pieces of search data indicating regions in which a computing node arranged at coordinates (1, 0) is set to the base point. Thereafter, as indicated by (Q) in FIG. 10, the search unit 15a sets a value obtained by adding 1 to the size of the region indicated by the search data T[1][0], yx[0] in the X axial direction to the size of the region indicated by the search data T[0][0], yx[0] in the X axial direction.

For example, when the search unit 15a calculates search data T[0][0], yx[2] indicating a region of which the size in the Y axial direction is "3" among the regions in which the computing node arranged at the coordinates (0, 0) is set to the base point, the search unit 15a executes the following processing. First, as indicated by (R) in FIG. 10, the search unit 15a refers to search data T[1][0], yx[2] indicating a region of which the size in the Y axial direction is "3" among pieces of search data indicating the regions in which the computing node arranged at the coordinates (1, 0) is set to the base point. Thereafter, the search unit 15a acquires, as the first value, a value obtained by adding 1 to the size of the region indicated by the search data T[1][0], yx[2] in the X axial direction.

In addition, as indicated by (S) in FIG. 10, the search unit 15a refers to search data T[0][1], yx[2] indicating a region of which the size in the Y axial direction is "2" among pieces of search data of regions in which the computing node arranged at coordinates (0, 1) is set to the base point. Thereafter, the search unit 15a acquires, as the second value, the size of the region indicated by the search data search data T[0][1], yx[2] in the X axial direction. Thereafter, the search unit 15a selects a smaller value from the first value and the second value that have been acquired and sets the selected value to the size of the region indicated by the search data T[0][0], yx[2] in the X axial direction.

Next, an example of the calculation processing that is executed for the Y axial direction by the search unit 15a is described with reference to FIG. 11. FIG. 11 is a view for explaining the procedure of the processing that is executed for the Y axial direction by the management device in the second embodiment. FIG. 11 illustrates an example where the search unit 15a calculates search data of a region in which the computing node arranged at the coordinates (0, 0) is set to the base point.

For example, when the search unit 15a searches search data T[0][0], xy[0] indicating a region of which the size in the X axial direction is "1" among regions in which the computing node arranged at the coordinates (0, 0) is set to the base point, the search unit 15a executes the following processing. First, the search unit 15a refers to a value of search data T[0][1], xy[0] indicating a region of which the size in the X axial direction is "1" among pieces of search data indicating regions in which the computing node arranged at the coordinates (0, 1) is set to the base point. Thereafter, as indicated by (T) in FIG. 11, the search unit 15a sets a value obtained by adding 1 to the size of the region indicated by the search data T[0][1], xy[0] in the Y axial direction to the size of the region indicated by the search data T[0][0], xy[0] in the Y axial direction.

For example, when the search unit 15a calculates search data T[0][0], xy[3] indicating a region of which the size in the X axial direction is "4" among the regions in which the computing node arranged at the coordinates (0, 0) is set to the base point, the search unit 15a executes the following processing. First, as indicated by (U) in FIG. 11, the search unit 15a refers to search data T[1][0], xy[3] indicating a region of which the size in the X axial direction is "3" among pieces of search data indicating regions in which the computing node arranged at the coordinates (1, 0) is set to the base point. Thereafter, the search unit 15a acquires, as the third value, the size of the region indicated by the search data T[1][0], xy[3] in the Y axial direction.

Figure 11:
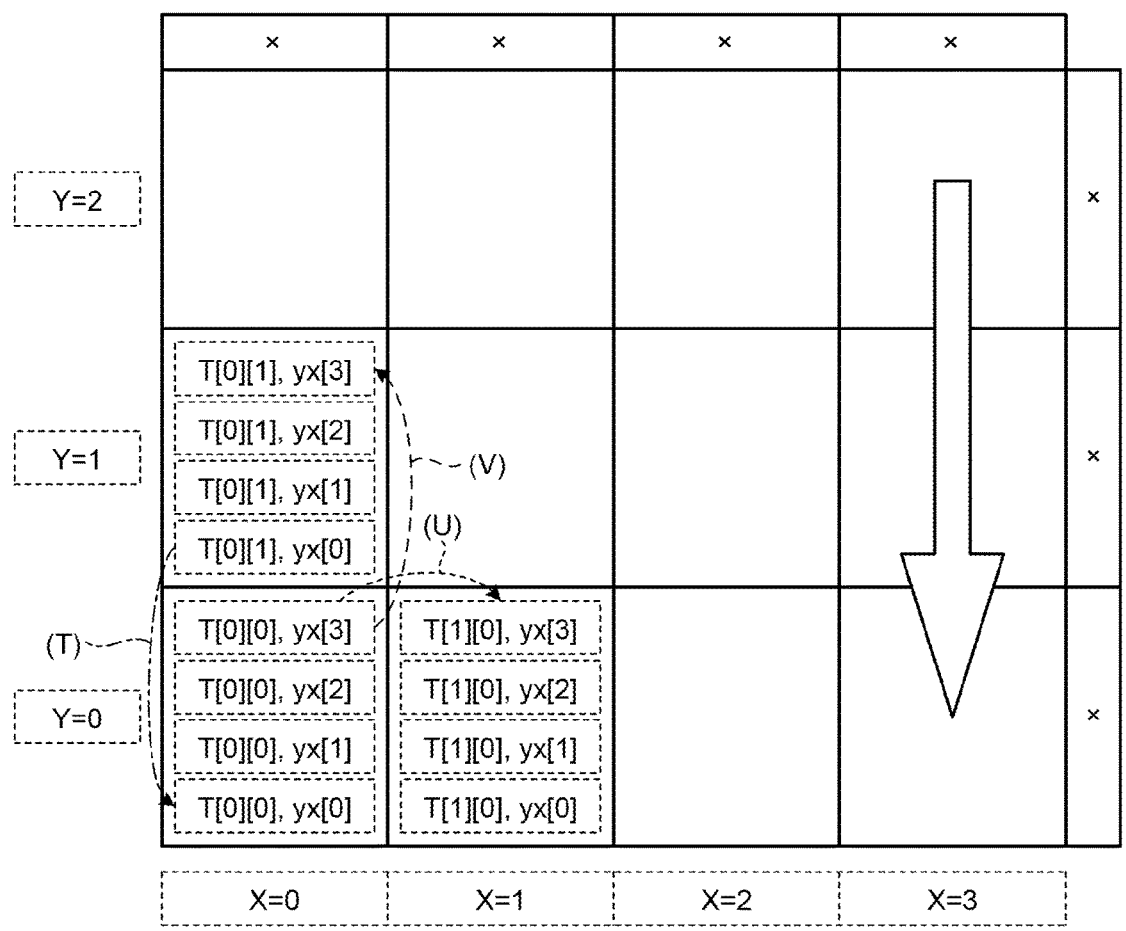
FIG. 11 is a view for explaining the procedure of processing that is executed for the Y axial direction by the management device in the second embodiment.

In addition, as indicated by (V) in FIG. 11, the search unit 15a refers to search data T[0][1], xy[3] indicating a region of which the size in the X axial direction is "4" among pieces of search data indicating regions in which the computing node arranged at the coordinates (0, 1) is set to the base point. Thereafter, the search unit 15a acquires, as the fourth value, the value obtained by adding 1 to the size of the region indicated by the search data T[0][1], xy[3] in the Y axial direction. Thereafter, the search unit 15a selects a smaller value from the third value and the fourth value that have been acquired and sets the selected value to the size of the region indicated by the search data T[0][0], xy[3] in the Y axial direction.

As described above, the search unit 15a selects the computing node as the search processing target, and generates the search data indicating the region in which the selected computing node is set to the base point from the search data indicating the region in which the computing node that is connected to the selected computing node in any axial direction is set to be base point. With this configuration, the search unit 15a can generate pieces of search data indicating regions in which the respective computing nodes are set to the base points simply by determining whether the respective computing nodes are the idle nodes without counting the number of continuous idle nodes in the respective axial directions while the respective computing nodes are set to the base points. As a result, the search unit 15a reduces the processing cost of the search processing, thereby shortening the time taken for the search processing.

Figure 12:
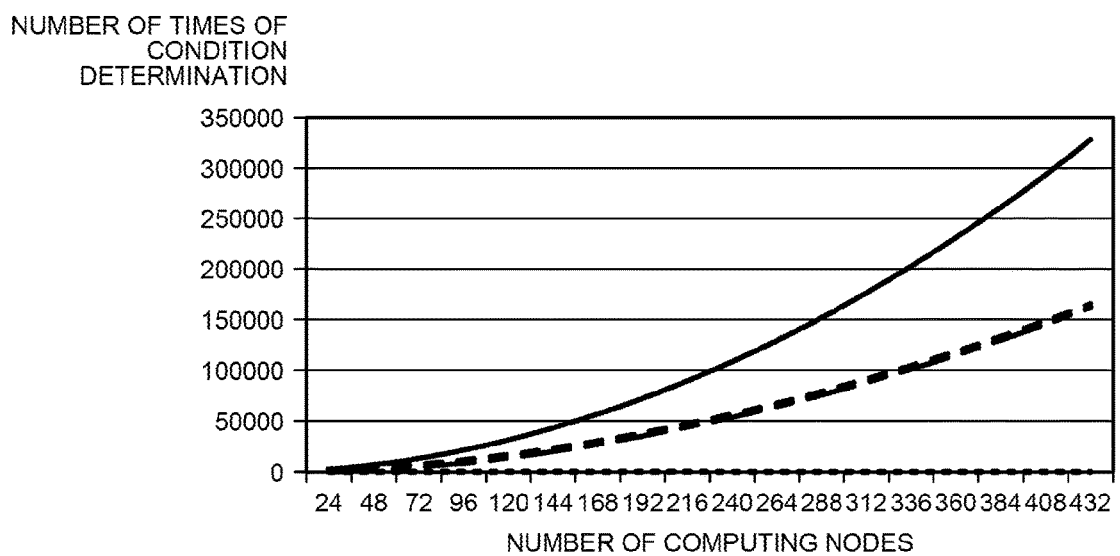
FIG. 12 is a graph for explaining an example of the number of times of condition determination that is executed by a related parallel computer system.

Next, advantageous effects by management device 10a are described with reference to FIG. 12 and FIG. 13. First, an example of the number of times of determination that is executed in the processing of searching for regions in which the idle nodes are continuous by the related parallel computer is described with reference to FIG. 12. FIG. 12 is a graph for explaining the example of the number of times of condition determination that is executed by the related parallel computer system.

Figure 30:
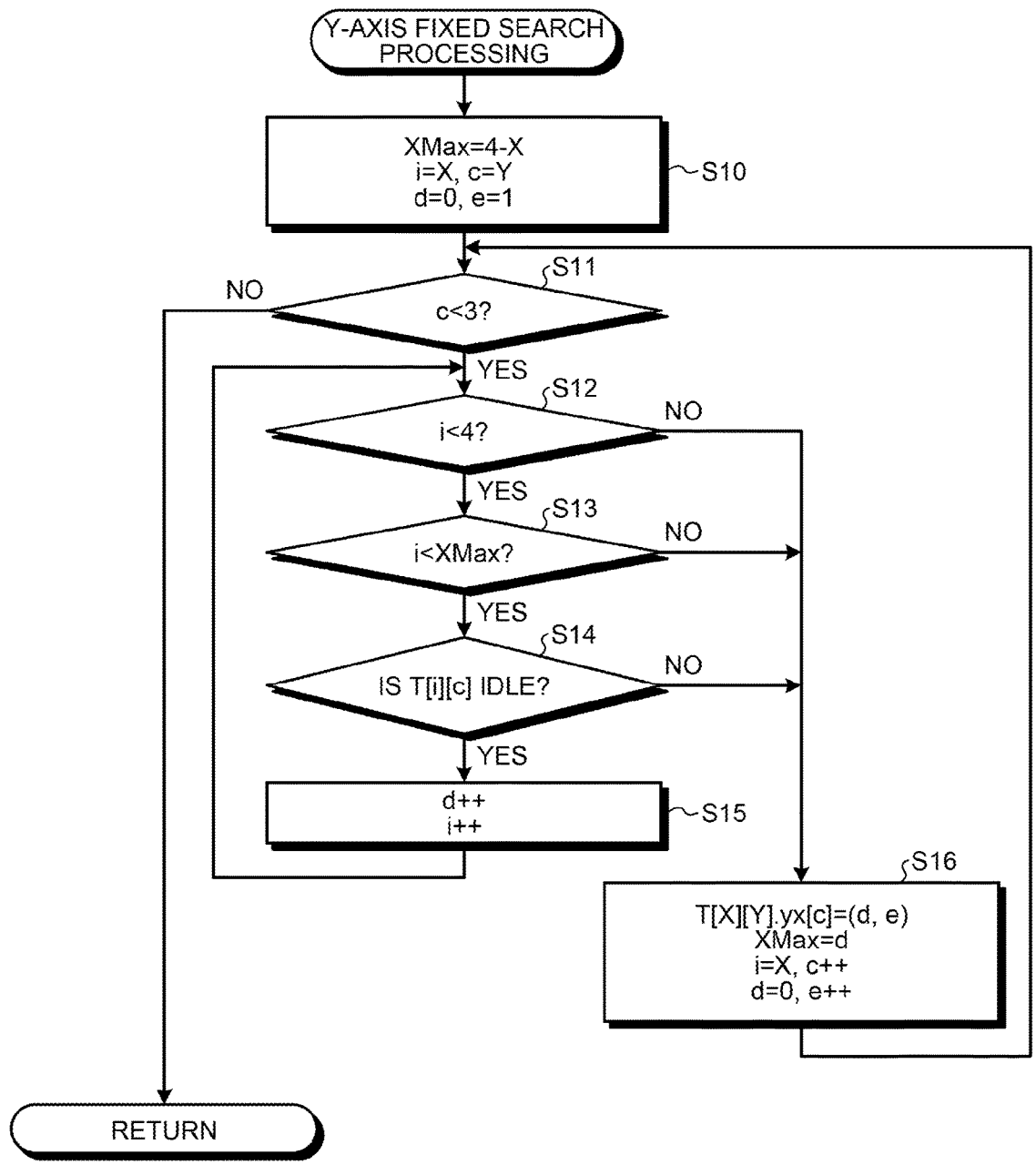
FIG. 30 is a second flowchart for explaining the procedure of the related idle node search processing.
Figure 31:
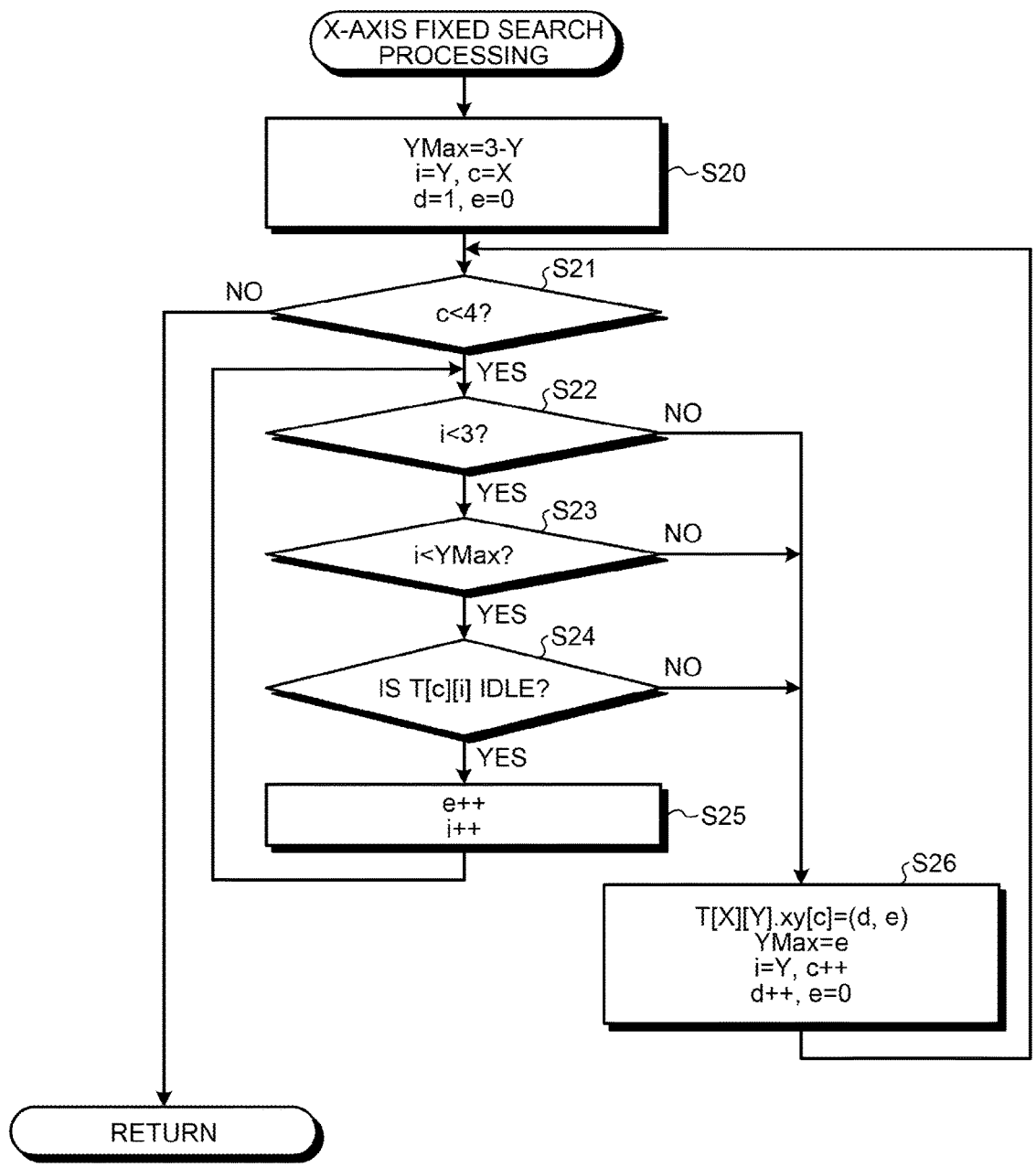
FIG. 31 is a third flowchart for explaining the procedure of the related idle node search processing.

In FIG. 12, the number of times of condition determination in each of the pieces of processing as illustrated in FIG. 29 and FIG. 31 is plotted while the horizontal axis is set to the number of computing nodes and the vertical axis is set to the number of times of condition determination. In FIG. 12, the number of times of condition determination in the main processing as illustrated in FIG. 29 is indicated by a dashed line, the number of times of condition determination in the Y-axis fixing determination processing as illustrated in FIG. 30 is indicated by an alternate long and short dash line, and the number of times of condition determination in the X-axis fixing determination processing as illustrated in FIG. 31 is indicated by a dotted line relative to the number of computing nodes. Furthermore, in FIG. 12, the total of the number of times of the pieces of condition determination processing is indicated by a solid line.

For example, as illustrated in FIG. 12, the related parallel computer system executes the condition determination processing by approximately 2500 times when the number of computing nodes is "24". Furthermore, when the number of computing nodes is "432", the parallel computer system executes the condition determination processing by approximately "330000" times. In this manner, in the related parallel computer, when the number of computing nodes becomes 18-fold, the number of execution times of the condition determination processing becomes approximately 130-fold.

Figure 13:
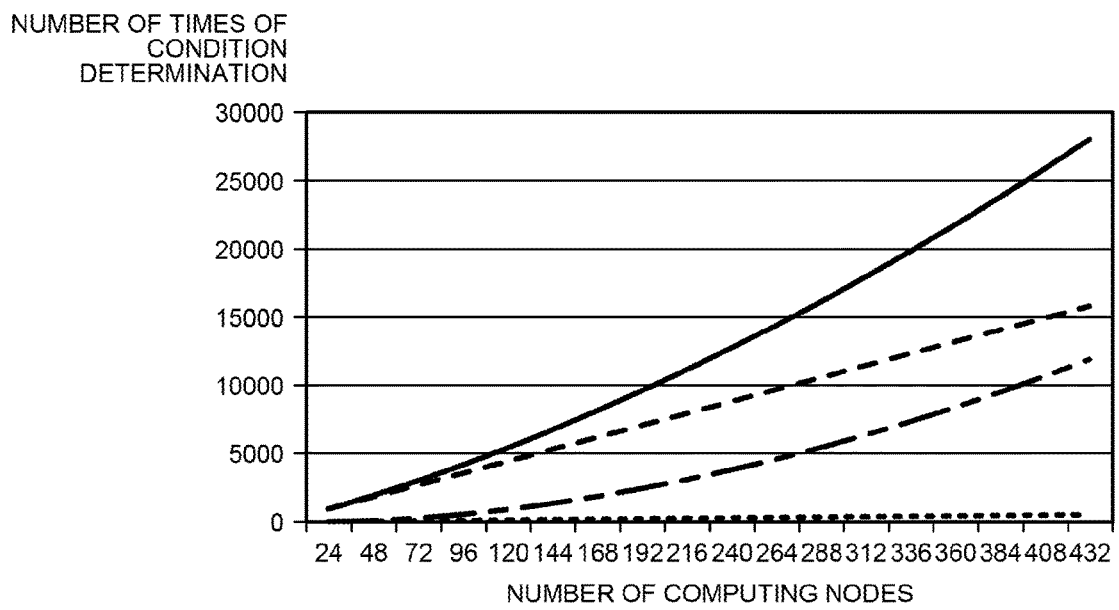
FIG. 13 is a graph for explaining an example of the number of times of condition determination that is executed by the management device in the second embodiment.

FIG. 13 is a graph for explaining an example of the number of times of condition determination that is executed by the management device in the second embodiment. In FIG. 13, the number of times of condition determination that is executed by the management device 10a is plotted while the horizontal axis is set to the number of computing nodes and the vertical axis is set to the number of times of condition determination in the same manner as FIG. 12. Furthermore, in FIG. 13, the number of times of condition determination in the main processing of selecting the computing node at the base point is indicated by a dashed line, the number of times of condition determination in the Y-axis fixing determination processing is indicated by an alternate long and short dash line, the number of times of condition determination in the X-axis fixing determination processing is indicated by a dotted line, and the total of the number of times of the pieces of condition determination processing is indicated by a solid line.

For example, as illustrated in FIG. 13, the management device 10a executes the condition determination processing by approximately "950" times when the number of computing nodes is "24". Furthermore, when the number of computing nodes is "432", the management device 10a executes the condition determination processing by approximately "30000" times. In this manner, the management device 10a can search the regions in which the idle nodes are continuous by approximately 1/12 processing in comparison with the related parallel computer system.

Figure 14:
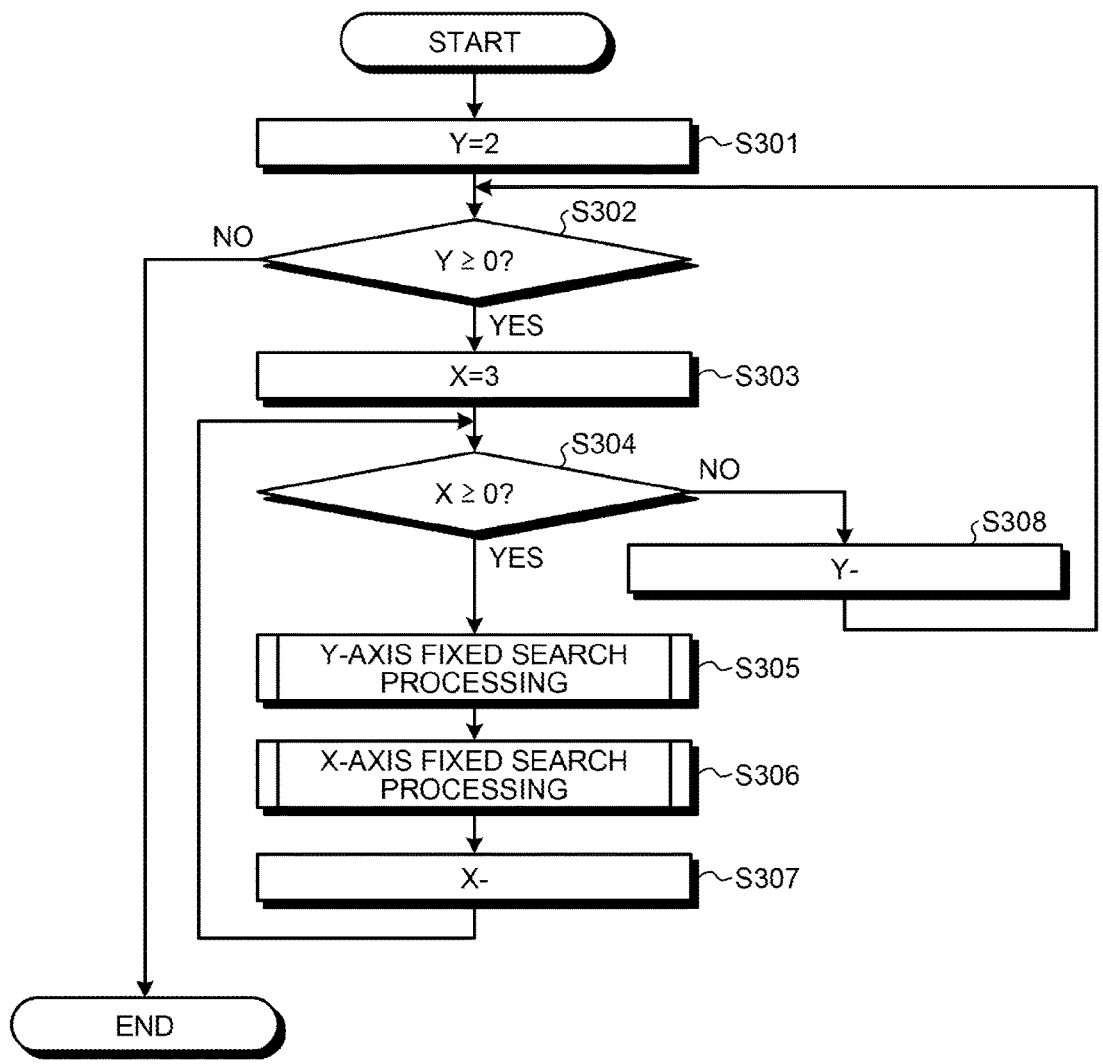
FIG. 14 is a flowchart for explaining the procedure of main processing that is executed by the management device in the second embodiment.
Figure 15:
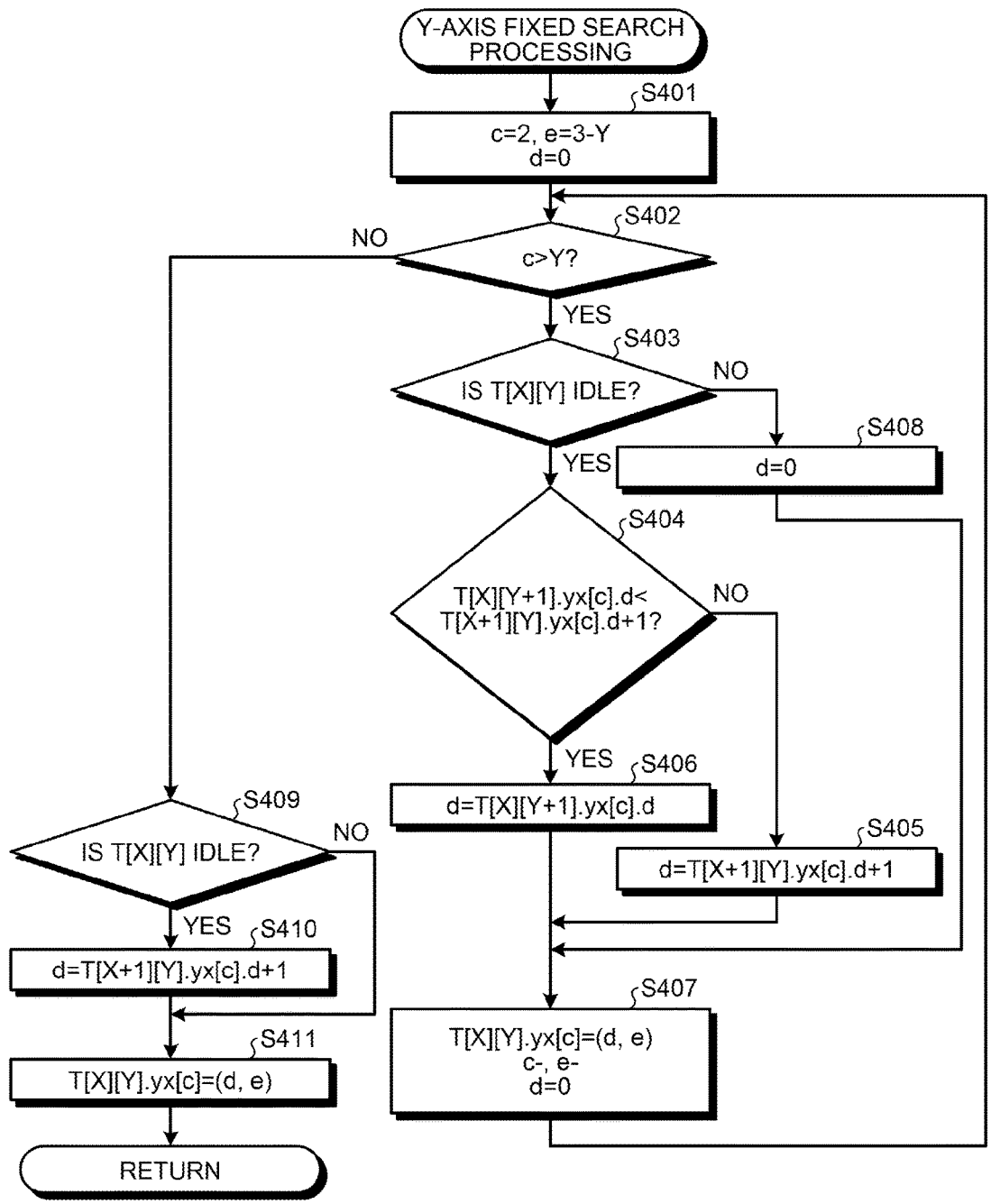
FIG. 15 is a flowchart for explaining the procedure of Y-axis fixed search processing that is executed by the management device in the second embodiment.
Figure 16:
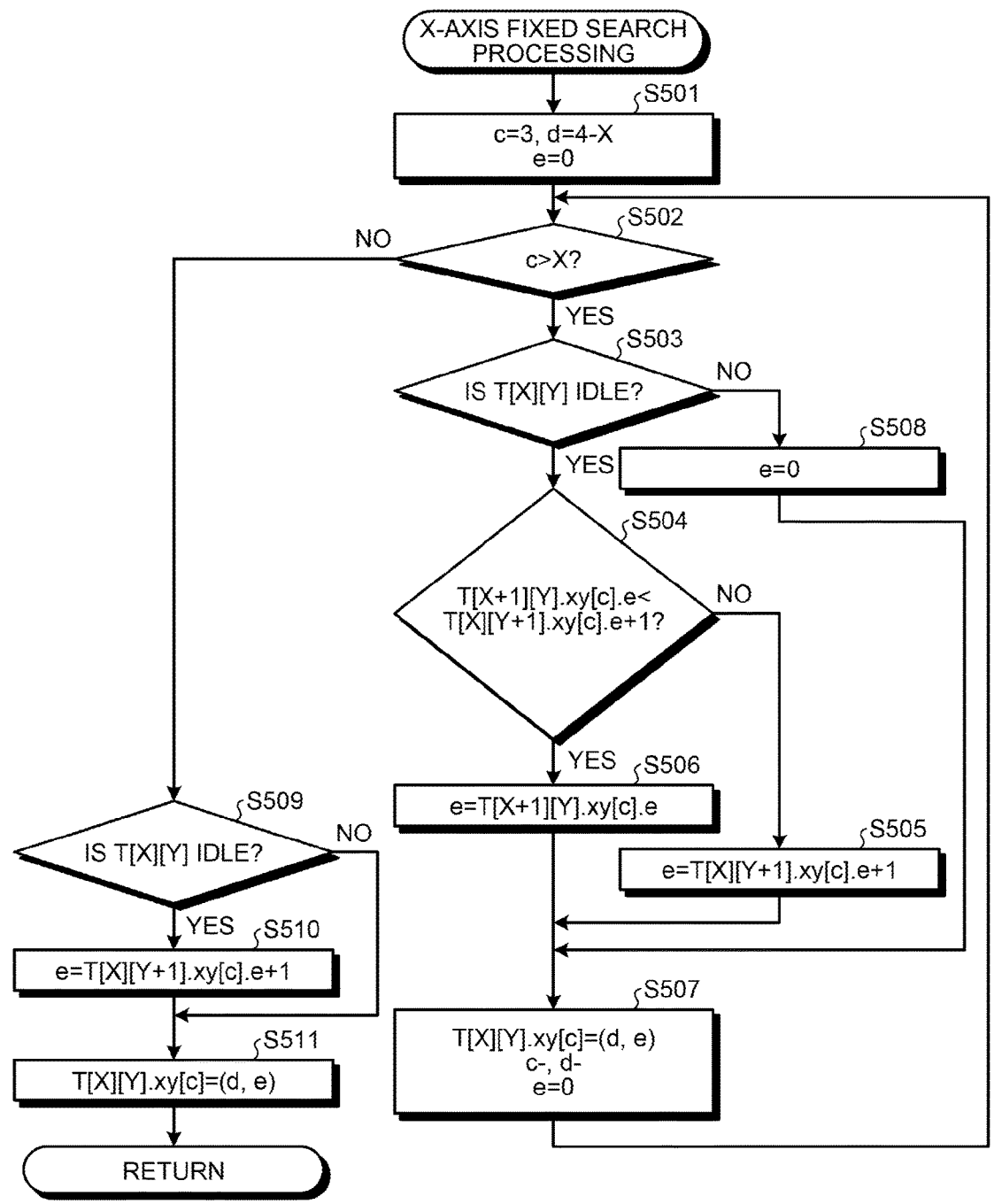
FIG. 16 is a flowchart for explaining the procedure of X-axis fixed search processing that is executed by the management device in the second embodiment.

Next, the procedure of the processing that is executed by the management device 10a is described with reference to FIGS. 14 to 16. First, the procedure of the main processing that is executed by the management device 10a is described with reference to FIG. 14. FIG. 14 is a flowchart for explaining the procedure of the main processing that is executed by the management device in the second embodiment. For example, the management device 10a initializes the Y value to "2" (step S301) and determines whether the Y value is equal to or larger than 0 (step S302). If the Y value is equal to or larger than 0 (Yes at step S302), the management device 10a initializes the X value to "3" (step S303) and determines whether the X value is equal to or larger than 0 (step S304).

If the X value is equal to or larger than 0 (Yes at step S304), the management device 10a executes the Y-axis fixed search processing while setting the X and Y values as arguments (step S305), and then, executes the X-axis fixed search processing while setting the X and Y values as arguments (step S306). Thereafter, the management device 10a subtracts 1 from the X value (step S307) and executes step S304. On the other hand, if the X value is smaller than 0 (No at step S304), the management device 10a subtracts 1 from the Y value (step S308) and executes step S302. If the Y value becomes smaller than 0 (No at step S302), the management device 10a finishes the processing.

Next, the procedure of the Y-axis fixed search processing that is executed by the management device 10a is described with reference to FIG. 15. FIG. 15 is a flowchart for explaining the procedure of the Y-axis fixed search processing that is executed by the management device in the second embodiment. The processing as illustrated in FIG. 15 corresponds to the processing at step S305 in FIG. 14. In the following description, the size of a region in the X axial direction that is searched as a result of execution of the Y-axis fixed search processing while the size in the Y axial direction is set to "c−1" among regions in which a computing node arranged at coordinates (X, Y) is set to the base point is expressed as T[X][Y].yx[c].d.

First, the management device 10a initializes values of the variables c, e, and d to set c=2, e=3−Y, and d=0 (step S401). The management device 10a then determines whether the c value is larger than the Y value (step S402). If it is determined that the c value is larger than the Y value (Yes at step S402), the management device 10a determines whether the computing node T[X][Y] arranged at the coordinates (X, Y) is the idle node (step S403).

If it is determined that the computing node T[X][Y] arranged at the coordinates (X, Y) is the idle node (Yes at step S403), the management device 10a executes the following processing. That is, the management device 10a determines whether a value of T[X][Y+1].yx[c].d (second value) is smaller than a value of T[X+1][Y].yx[c].d+1 (first value) (step S404).

If it is determined that the second value is equal to or larger than the first value (No at step S404), the management device 10a sets the d value to the first value (step S405). On the other hand, if it is determined that the second value is smaller than the first value (Yes at step S404), the management device 10a sets the d value to the second value (step S406).

Subsequently, the management device 10a outputs T[X][Y].yx[c]=(d, e) as data indicating the region in which the computing node arranged at the coordinates (X, Y) is set to the base point, subtracts 1 from each of the c and e values, and initializes the d value to 0 (step S407). The management device 10a then executes step S402 again. If it is determined that the computing node T[X][Y] is not the idle node (No at step S403), the management device 10a initializes the d value to 0 (step S408) and executes step S407.

If it is determined that the c value is equal to or smaller than the Y value (No at step S402), the management device 10a determines whether the computing node T[X][Y] is the idle node (step S409). If it is determined that the computing node T[X][Y] is the idle node (Yes at step S409), the management device 10a sets the d value to T[X+1][Y].yx[c].d+1 (step S410). On the other hand, if it is determined that the computing node T[X][Y] is not the idle node (No at step S409), the management device 10a skips step S410. Thereafter, the management device 10a outputs T[X][Y].yx[c]=(d, e) (step S411) and finishes the processing.

Next, the procedure of the X-axis fixed search processing that is executed by the management device 10a is described with reference to FIG. 16. FIG. 16 is a flowchart for explaining the procedure of the X-axis fixed search processing that is executed by the management device in the second embodiment. The processing as illustrated in FIG. 16 corresponds to the processing at step S306 in FIG. 14. In the following description, the size of a region in the Y axial direction that is searched as a result of execution of the X-axis fixed search processing while the size in the X axial direction is set to "c−1" among regions in which the computing node arranged at the coordinates (X, Y) is set to the base point is expressed as T[X][Y].xy[c].e.

First, the management device 10a initializes values of the variables c, d, and e to set c=3, d=4−X, and e=0 (step S501). The management device 10a then determines whether the c value is larger than the X value (step S502). If it is determined that the c value is larger than the X value (Yes at step S502), the management device 10a determines whether the computing node T[X][Y] arranged at the coordinates (X, Y) is the idle node (step S503).

If it is determined that the computing node T[X][Y] arranged at the coordinates (X, Y) is the idle node (Yes at step S503), the management device 10a executes the following processing. That is, the management device 10a determines whether a value of T[X+1][Y].xy[c].e (third value) is smaller than a value of T[X][Y+1].xy[c].e+1 (fourth value) (step S504).

If it is determined that the third value is equal to or larger than the fourth value (No at step S504), the management device 10a sets the e value to the fourth value (step S505). On the other hand, if it is determined that the third value is smaller than the fourth value (Yes at step S504), the management device 10a sets the e value to the third value (step S506).

Subsequently, the management device 10a outputs T[X][Y].xy[c]=(d, e) as data indicating the region in which the computing node arranged at the coordinates (X, Y) is set to the base point, subtracts 1 from each of the c and e values, and initializes the e value to 0 (step S507). The management device 10a then executes step S502 again. If it is determined that the computing node T[X][Y] is not the idle node (No at step S503), the management device 10a initializes the e value to 0 (step S508) and executes step S507.

If it is determined that the c value is equal to or smaller than the X value (No at step S502), the management device 10a determines whether the computing node T[X][Y] is the idle node (step S509). If it is determined that the computing node T[X][Y] is the idle node (Yes at step S509), the management device 10a sets the e value to T[X][Y+1].xy[c].e+1 (step S510). On the other hand, if it is determined that the computing node T[X][Y] is not the idle node (No at step S509), the management device 10a skips step S510. Thereafter, the management device 10a outputs T[X][Y].xy[c]=(d, e) (step S511) and finishes the processing.

Advantageous Effects of Parallel Computer System 1a

As described above, the management device 10a executes the selection processing of selecting the computing node at the negative side in the predetermined axial direction in the order from the computing node of which the connection distance from the computing node at the origin is the maximum while changing the connection distance in the axial direction other than the predetermined axial direction. Furthermore, the management device 10a determines whether the job is assigned to each of the selected computing nodes.

If it is determined that no job is assigned to the selected computing node, the management device 10a executes the following processing. That is, the management device 10a refers to a search result of a region in which another computing node that is connected to the selected computing node and of which the connection distance from the origin in any axial direction is larger than that of the selected computing node is set to the base point. Thereafter, the management device 10a searches for a region in which the selected computing node is set to the base point using the referred search result.

With this configuration, the management device 10a can calculate all pieces of search data indicating regions in which the selected computing node is set to the base point without counting the number of idle nodes continuous in the respective axial directions while the selected node is set to the base point. As a result, the management device 10a reduces the processing cost of the search processing, thereby shortening the time taken for the search processing.

The management device 10a needs not store therein the node table 12 including the first information indicating whether the job is assigned to the respective computing nodes and the second information indicating that the job is assigned to the virtual computing nodes. That is to say, the management device 10a may determine whether the selected node is the node at the termination end as in the related manner without including the second information indicating that the job is assigned to the virtual nodes in the node table 12. Even when the processing is executed, the management device 10a can reduce the processing cost when searching the regions in which the idle nodes are continuous, thereby shortening the time taken for the search processing.

When the node table 12 includes the second information indicating that the job is assigned to the virtual nodes, the management device 10a can eliminate the processing of determining whether the selected node is the node at the termination end. As a result, the management device 10a can further shorten the time taken for the search processing.

When the management device 10a searches for a region of which the size in the first axial direction is 1 among the regions in which the selected computing node is set to the base point, the management device 10a specifies a computing node that is connected to the selected computing node in the second axial direction. Furthermore, the search unit 15a calculates a value obtained by adding 1 to the size of a region in the second axial direction that is indicated by search data indicating the region of which the size in the first axial direction is 1 among pieces of search data in which the specified computing node is set to the base point.

The search unit 15a outputs search data in which the calculated value is set to the size of the region in the second axial direction of which the size in the first axial direction is 1 among the regions in which the selected computing node is set to the base point. With this configuration, when the search unit 15a searches for the region of which the size in the first axial direction is 1, the search unit 15a can calculate the search data simply by performing addition processing without executing the processing of determining whether another computing node is the idle node.

When the search unit 15a searches for a region of which the connection distance in the first axial direction is equal to or larger than 2 among the regions in which the selected computing node is set to the base point, the search unit 15a executes the following processing. First, the search unit 15a specifies a region of which the connection distance in the first axial direction is the same as the connection distance of the region as the search target in the first axial direction among regions in which the computing node that is connected to the selected computing node in the second axial direction is set to the base point. Thereafter, the search unit 15a acquires the connection distance of the specified region in the second axial direction, for example, the second value.

Furthermore, the search unit 15a specifies a region of which the connection distance in the first axial direction is a value obtained by subtracting 1 from the connection distance of the region as the search target in the first axial direction among regions in which a computing node that is connected to the selected computing node in the first axial direction is set to the base point. Thereafter, the search unit 15a acquires the connection distance of the specified region in the second axial direction, for example, the first value.

Thereafter, the search unit 15a sets a smaller value from the first value and the second value to the connection distance of the region as the search target in the second axial direction. With this configuration, when the search unit 15a searches for a region of which the size in the first axial direction is 2, the search unit 15a can calculate the search data simply by executing processing of comparing the first value and the second value.

[c] Third Embodiment

In the first and the second embodiments described above, an example in which the parallel computer 3 includes the computing nodes 3a to 3f forming the two-dimensional mesh network has been described. The embodiment is, however, not limited thereto.

For example, the management device 10 or 10a has a torus network in which the computing nodes 3a to 3f are connected in a circular-ring form in the X axial direction in some cases. In this case, it is difficult for the management device 10 or 10a to search a region coming around in the circular-ring direction appropriately simply by executing the above-mentioned processing.

The management device 10 or 10a sets the respective computing nodes from the computing node arranged at the coordinates (0, 0) to the computing node arranged at the coordinates (3, 0) to the virtual origins. Thereafter, the management device 10 or 10a executes the main processing, the X-axis fixed search processing, and the Y-axis fixed search processing as described above for the respective virtual origins. As a result, the management device 10 or 10a can calculate search data in consideration of regions over the torus.

When the processing is executed, the management device 10 or 10a executes the main processing, the X-axis fixed search processing, and the Y-axis fixed search processing as described above for the respective virtual origins, resulting in an increase in the time taken for the search processing. To address this, a parallel computer system 1b in the third embodiment generates node tables for the respective virtual origins. Thereafter, the parallel computer system 1b executes the pieces of search processing using the node tables generated for the respective virtual origins in parallel so as to shorten time when calculating pieces of search data in consideration of the regions over the torus is calculated.

Figure 17:
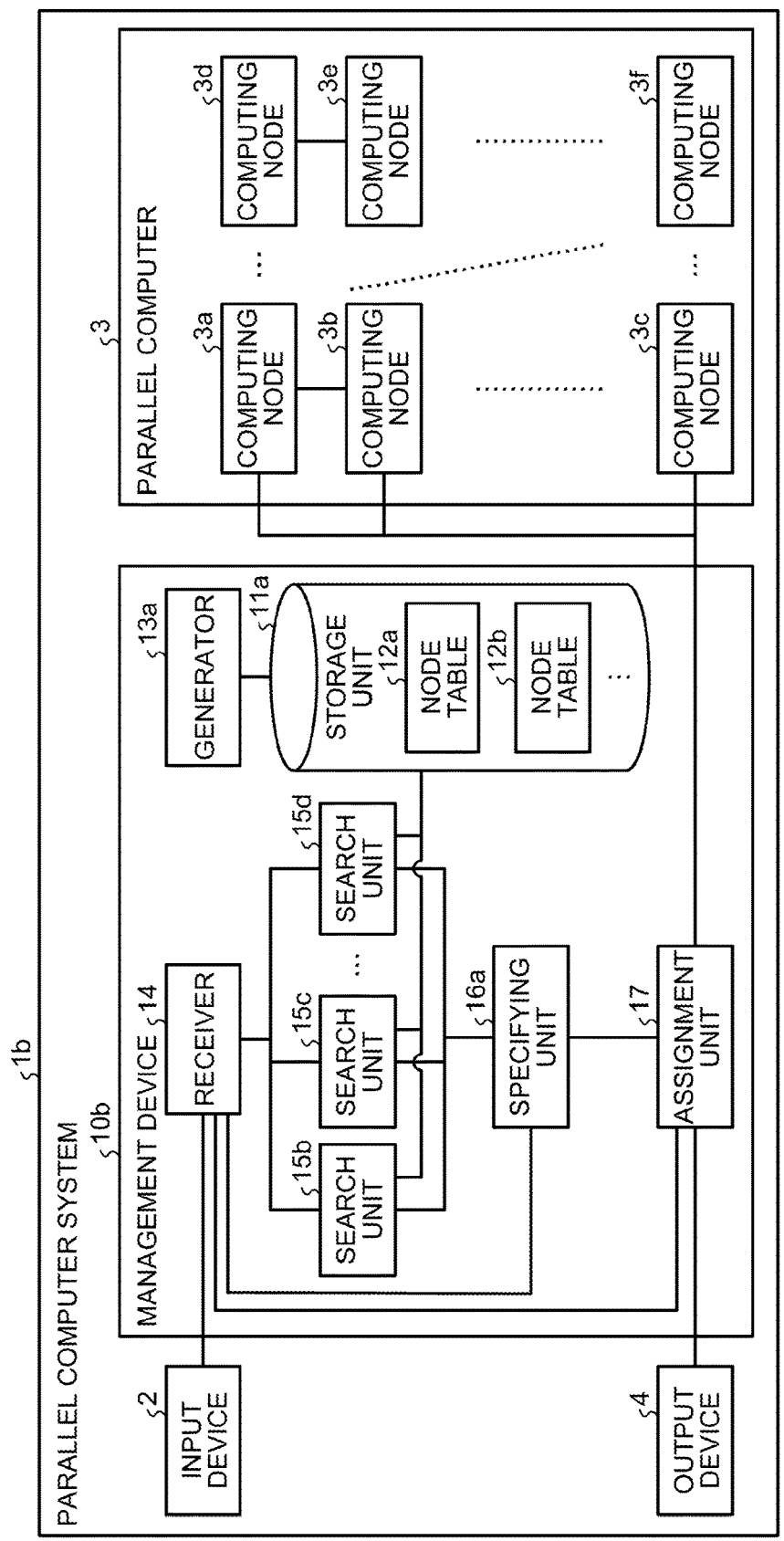
FIG. 17 is a diagram for explaining a parallel computer system according to a third embodiment.

Hereinafter, the parallel computer system 1b in the third embodiment is described with reference to FIG. 17. FIG. 17 is a diagram for explaining the parallel computer system in the third embodiment. In the following explanation, the same reference numerals denote the components exhibiting the same functions as those in the first or the second embodiment described above and description thereof is omitted below.

As illustrated in FIG. 17, the parallel computer system 1b includes the input device 2, the parallel computer 3, the output device 4, and a management device 10b. The management device 10b includes a storage unit 11a storing therein a plurality of node tables 12a and 12b, a generator 13a, the receiver 14, a plurality of search units 15b to 15d, a specifying unit 16a, and the assignment unit 17. It is noted that the storage unit 11a stores a plurality of node tables additionally.

The parallel computer 3 includes the plurality of computing nodes 3a to 3f as in the parallel computer 3 in the above-mentioned embodiments. The computing nodes 3a to 3f included in the parallel computer 3 form a torus network in which they are connected in a circular ring form in the X axial direction or the Y axial direction or any combination thereof.

The node tables 12a and 12b are node tables storing therein virtual coordinates of the respective computing nodes and valid bits indicating whether a job is assigned to the respective computing nodes in a correspondence manner when setting the different computing nodes to the virtual origins. For example, the node table 12a is the node table when the computing node 3a is set to the virtual origin and the node table 12b is the node table when the virtual node 3b is set to the virtual origin.

The generator 13a generates the node tables storing therein the coordinates of the respective computing nodes and the valid bits indicating whether the job is assigned to the respective computing nodes in a correspondence manner as in the generator 13.

Furthermore, when the computing nodes 3a to 3f form a two-dimensional torus network in which they are connected in a circular ring form in any one of the X axial direction and the Y axial direction, the generator 13a generates a plurality of node tables in which the respective computing nodes connected in the circular ring form are set to the virtual origins. The following describes processing of generating the plurality of node tables that is executed by the generator 13a with reference to FIG. 18.

Figure 18:
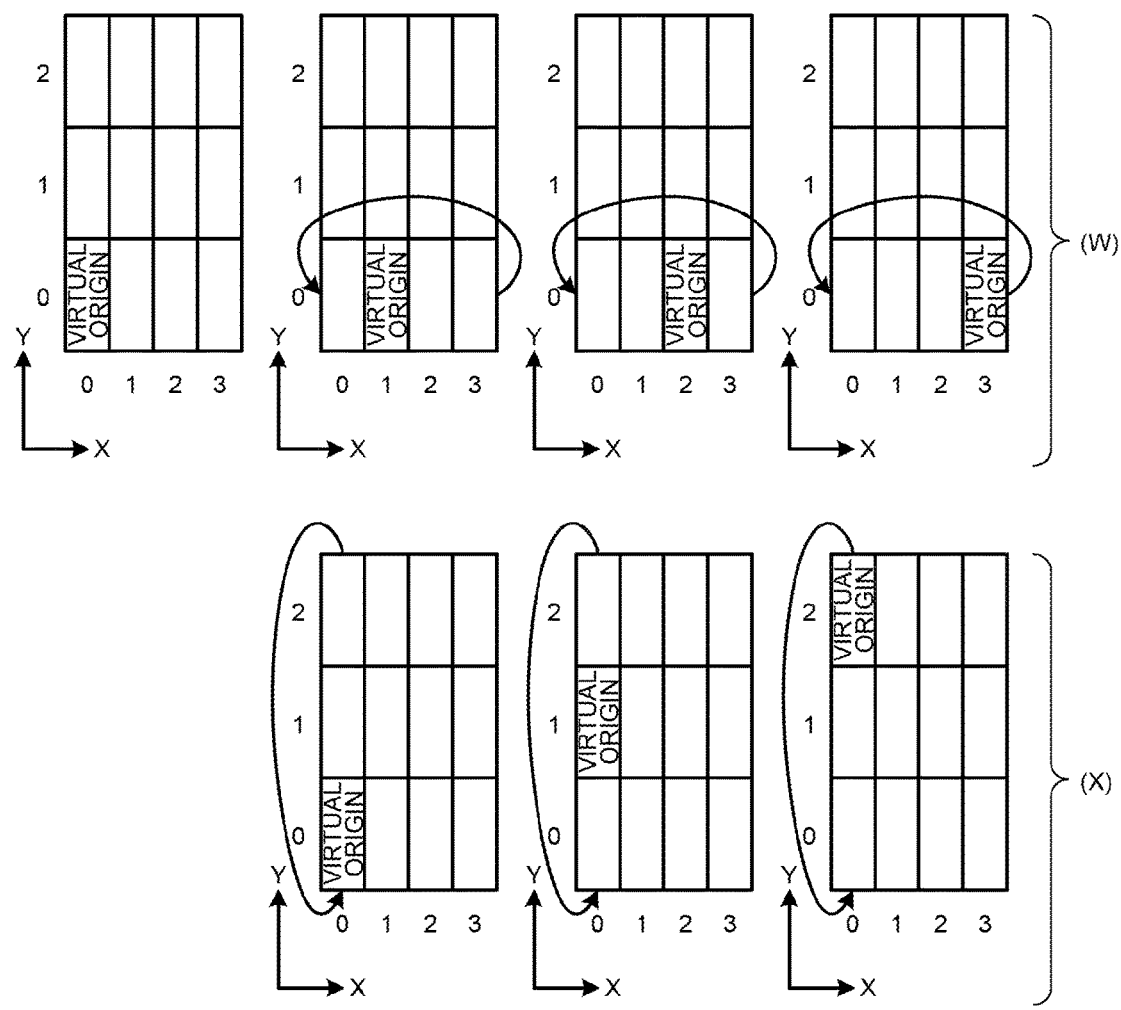
FIG. 18 is a view for explaining examples of a virtual origin.

FIG. 18 is a view for explaining examples of the virtual origins. For example, when the computing nodes 3a to 3f are connected in a circular ring form in the X axial direction, as indicated by (W) in FIG. 18, the generator 13a generates node tables in which the respective computing nodes arranged at the coordinates (0, 0) to the coordinates (3, 0) are set to the virtual origins. In this case, the generator 13a generates the node tables in consideration of coming-around in the X axial direction.

As is described in detail, when the computing node arranged at the coordinates (1, 0) is set to the virtual origin, the generator 13a generates a node table while the computing node arranged at the coordinates (0, 0) is considered as a computing node arranged at virtual coordinates (3, 0). When the computing node arranged at the coordinates (2, 0) is considered as the virtual origin, the generator 13a generates a node table while the computing nodes arranged at the coordinates (0, 0) and the coordinates (1, 0) are considered as computing nodes arranged at virtual coordinates (2, 0) and (3, 0), respectively. Furthermore, when the computing node arranged at the coordinates (3, 0) is set to the virtual origin, the generator 13a generates a node table while the computing nodes arranged at the coordinates (0, 0) to (2, 0) are considered as computing nodes arranged at virtual coordinates (1, 0) to (3, 0), respectively.

For example, when the computing nodes 3a to 3f are connected in a circular ring form in the Y axial direction, as indicated by (X) in FIG. 18, the generator 13a generates node tables in which the respective computing nodes arranged at the coordinates (0, 0) to the coordinates (0, 2) are set to the virtual origins. In this case, the generator 13a generates the node tables in consideration of coming-around in the Y axial direction.

As is described in detail, when the computing node arranged at the coordinates (0, 1) is set to the virtual origin, the generator 13a generates a node table while the computing node arranged at the coordinates (0, 0) is considered as a computing node arranged at virtual coordinates (0, 2). When the computing node arranged at the coordinates (0, 2) is set to the virtual origin, the generator 13a generates a node table while the computing nodes arranged at the coordinates (0, 0) and the coordinates (0, 1) are considered as computing nodes arranged at virtual coordinates (0, 1) and (0, 2), respectively.

When the computing nodes 3a to 3f included in the parallel computer 3 form a three-dimensional torus network in which they are connected in a circular ring form in the X axial direction and the Y axial direction, the generator 13a generates a plurality of node tables in which all the computing nodes 3a to 3f are set to the virtual origins. Also in this case, the generator 13a generates node tables in which coordinates of computing node other than the computing nodes as the virtual origins are set in consideration of coming-around in the respective axial directions.

Returning back to FIG. 17, the search units 15b to 15d execute the pieces of search processing in parallel using the different node tables. Thereafter, the search units 15b to 15d generate pieces of search data while the different computing nodes are set to the virtual origins, and output the pieces of generated search data to the specifying unit 16.

Figure 19:
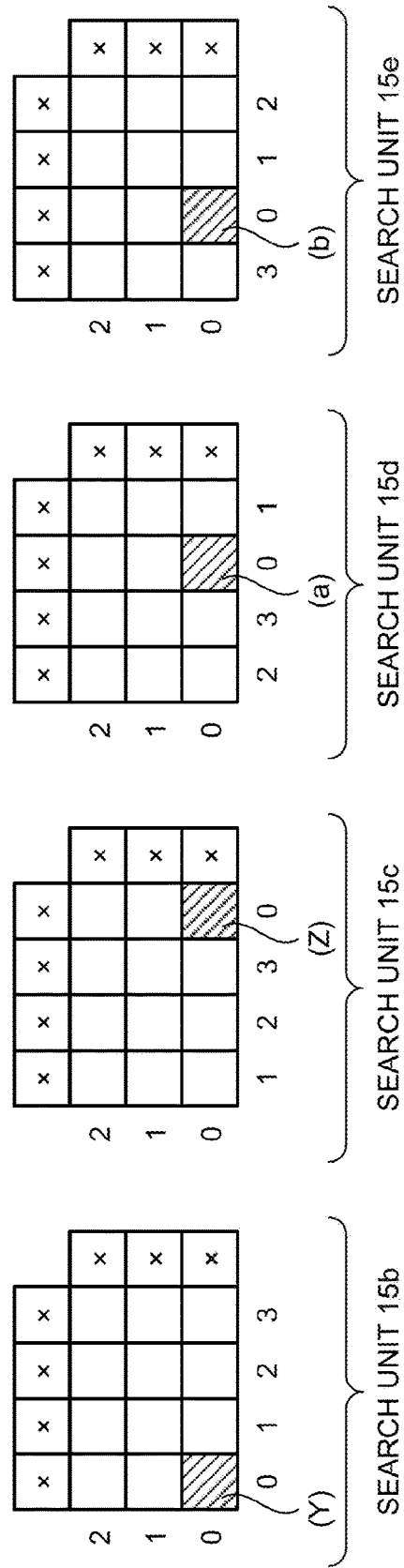
FIG. 19 is a view for explaining processing that is executed by a management device in the third embodiment.

For example, FIG. 19 is a view for explaining the processing that is executed by the management device in the third embodiment. FIG. 19 illustrates an example of the processing that is executed by the management device 10b when the computing nodes 3a to 3f form the two-dimensional torus network in which they are connected in the circular ring form in the X axial direction. A search unit 15e as illustrated in FIG. 19 corresponds to a search unit that is not illustrated in FIG. 17 and exhibits the same functions as those of the search units 15b to 15d.

For example, as indicated by (Y) in FIG. 19, the generator 13a generates a node table while the computing node arranged at the coordinates (0, 0) is set to the virtual origin. The search unit 15b executes the processing of searching for regions in which the idle nodes are continuous using the generated node table. As indicated by (Z) in FIG. 19, the generator 13a generates a node table while the computing node arranged at the coordinates (3, 0) is set to the virtual origin and the coordinates of other computing nodes are modified to coordinates in consideration of coming-around in the X axial direction. The search unit 15c executes the processing of searching for regions in which the idle nodes are continuous using the generated node table.

Furthermore, as indicated by (a) in FIG. 19, the generator 13a generates a node table while the computing node arranged at the coordinates (2, 0) is set to the virtual origin and the coordinates of other computing nodes are modified to coordinates in consideration of coming-around in the X axial direction. The search unit 15d executes the processing of searching for regions in which the idle nodes are continuous using the generated node table.

In addition, as indicated by (b) in FIG. 19, the generator 13a generates a node table while the computing node arranged at the coordinates (1, 0) is set to the virtual origin and the coordinates of other computing node are modified to coordinates in consideration of coming-around in the X axial direction. The search unit 15e executes the processing of searching for regions in which the idle nodes are continuous using the generated node table.

Thus, the management device 10b includes the plurality of search units 15b to 15e. When the computing nodes 3a to 3f form the torus network in which they are connected in the circular ring form in the X axial direction, the management device 10b generates the node tables 12a and 12b in which the respective computing nodes of which the coordinates in the Y axial direction are "0" are set to the virtual origins. Thereafter, the management device 10b causes the respective search units 15b to 15e to execute the pieces of processing of searching the regions in which the idle nodes are arranged continuously, using the different node tables 12a and 12b in parallel.

As a result, also when the computing nodes 3a to 3f form the torus network in which they are connected in the circular ring form in the X axial direction, the management device 10b executes the pieces of search processing for the respective virtual origins in parallel so as to shorten the time taken for the search processing.

When the pieces of search processing are executed, for example, the search units 15b to 15e output pieces of data in the format as illustrated in (N) in FIG. 5 by the number that is the same as the number of virtual origins, resulting in an increase in the time taken for sorting of the pieces of search data. To address this, the specifying unit 16a executes the following processing.

For example, when the computing nodes 3a to 3f form the two-dimensional torus network, the pieces of search data that are output from the respective search units 15b to 15e include data incorporating a region indicated by another region in some cases. As the detail example thereof is described, a plurality of pieces of search data that are acquired when the Y-axis fixed search processing is executed are pieces of search data indicating regions of which the sizes in the Y axial direction are decreased one by one. Furthermore, the plurality of pieces of search data that are acquired when the X-axis fixed search processing is executed are pieces of search data indicating regions of which the sizes in the X axial direction are decreased one by one.

In view of this, the specifying unit 16a compares a region indicated by first search data and a region indicated by search data indicating a region of which the size in the axial direction other than the predetermined axial direction is larger than that of the region indicated by the first search data, that is, the search data that is higher-order than the first search data. When the size of the region indicated by the second search data in the predetermined axial direction is larger than the size of the region indicated by the first search data in the predetermined axial direction, the specifying unit 16a excludes the first search data from the search result.

To be specific, the specifying unit 16a collects the pieces of search data calculated by the search units 15b to 15e and sorts them in the descending order of the sizes of the region indicated by the search data in the respective axial directions. The specifying unit 16a also determines whether the region indicated by each search data includes a region indicated by low-order search data in the order from the highest-order search data. When the region indicated by the search data includes the region indicated by the low-order search data, the specifying unit 16a deletes the low-order search data.

Figure 20:
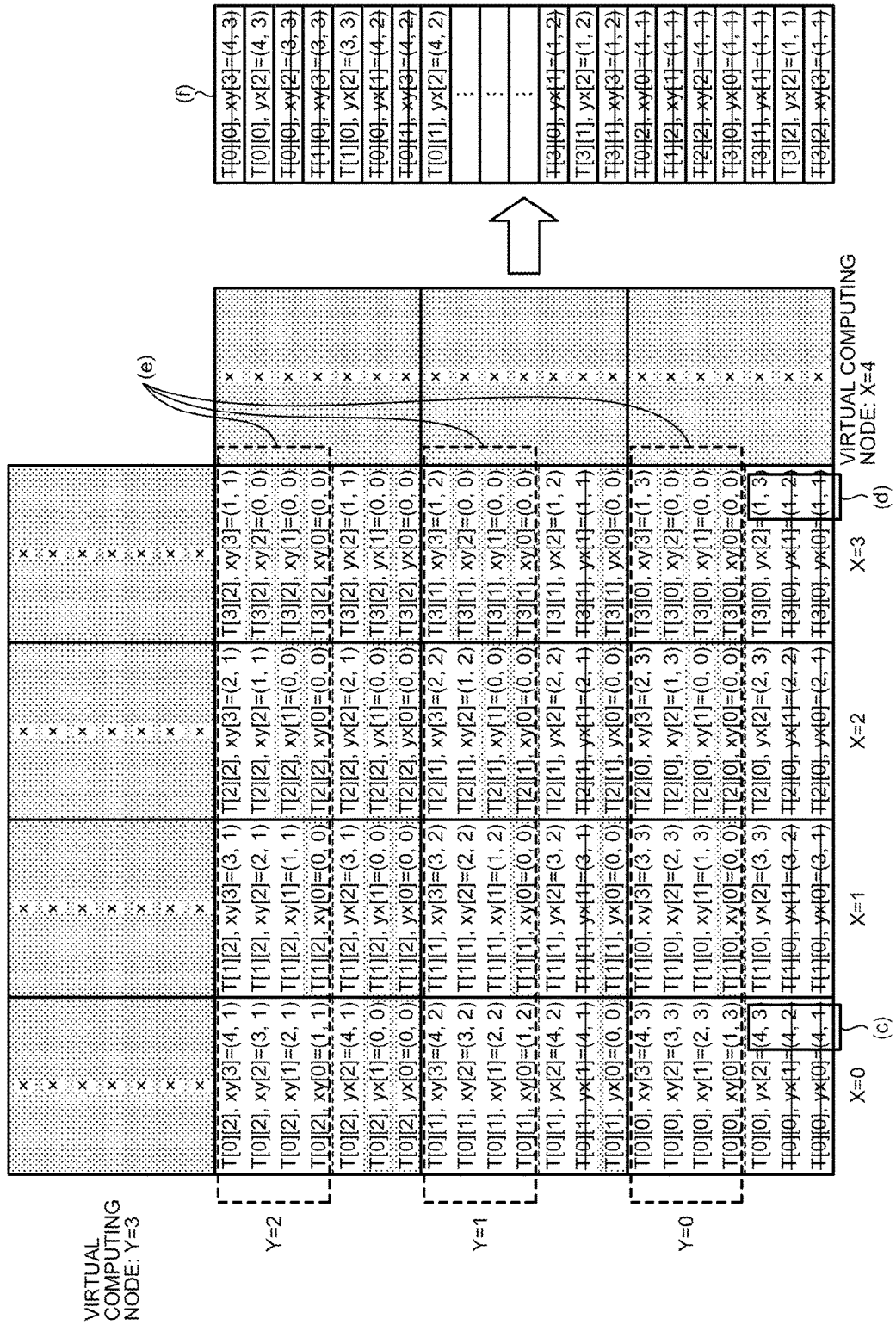
FIG. 20 is a view for explaining the procedure of processing of deleting pieces of search data that is executed by the management device in the third embodiment.

FIG. 20 is a view for explaining the procedure of processing of deleting the search data that is executed by the management device in the third embodiment. FIG. 20 illustrates an example of the processing of deleting unnecessary search data from the pieces of search data as illustrated in FIG. 5. For example, the specifying unit 16a sorts all the pieces of search data as illustrated in FIG. 20 in the descending order of the size of the region indicated by the search data and determines whether a region indicated by high-order search data includes a region indicated by low-order search data.

As indicated by (c) in FIG. 20, the sizes of regions indicated by T[0][0], yx[0] and T[0][0], yx[1] in the X axial direction are equal to or smaller than the size of a region indicated by T[0][0], yx[2] in the X axial direction. Based on this, the specifying unit 16a determines that the region indicated by T[0][0], yx[2] includes the regions indicated by T[0][0], yx[0] and T[0][0], yx[1], and deletes T[0][0], yx[0] and T[0][0], yx[1].

Furthermore, the specifying unit 16a executes the same processing. With this configuration, as indicated by (d) in FIG. 20, the specifying unit 16a excludes pieces of search data other than T[3][0], yx[2] among pieces of search data from T[3][0], yx[0] to T[3][0], yx[2]. The specifying unit 16a compares pieces of search data acquired by the X axial direction fixing processing, that is, pieces of search data as indicated by (e) in FIG. 20 with pieces of search data acquired by the Y axial direction fixing processing. As a result, the specifying unit 16a deletes all the pieces of search data as indicated by (e) in FIG. 20.

Consequently, as indicated by (f) in FIG. 20, the specifying unit 16a can acquire pieces of search data with no waste. Thereafter, the specifying unit 16a specifies search data indicating a region that is optimum for job assignment from the pieces of search data as indicated by (f) in FIG. 20.

Figure 21:
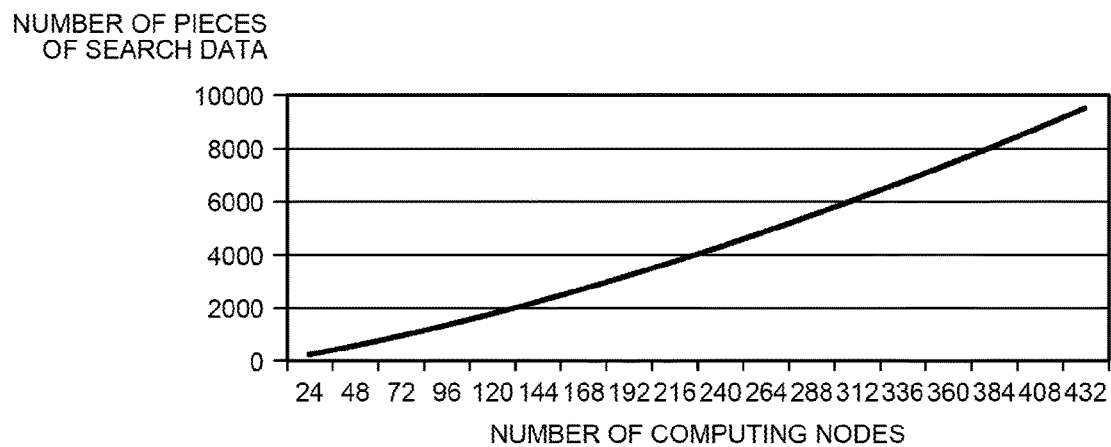
FIG. 21 is a graph for explaining an example of the number of pieces of search data that are output from a related parallel computer system.

Next, an example of a deletion amount of the pieces of search data by deleting pieces of low-order search data indicating regions included in regions indicated by pieces of high-order search data is described with reference to FIG. 21 and FIG. 22. FIG. 21 is a graph for explaining an example of the number of pieces of search data that are output from the related parallel computer system. In FIG. 21, the number of pieces of search data that are output from the related parallel computer system is plotted while the horizontal axis is set to the number of computing nodes and the vertical axis is set to the number of pieces of search data in the same manner as FIG. 12.

For example, as illustrated in FIG. 21, the related parallel computer system outputs "324" pieces of search data when the number of computing nodes is "24". Furthermore, when the number of computing nodes is "432", the parallel computer system outputs "9504" pieces of search data. In this manner, in the related parallel computer, when the number of computing nodes becomes 18-fold, the number of pieces of search data that are output is approximately 29-fold.

Figure 22:
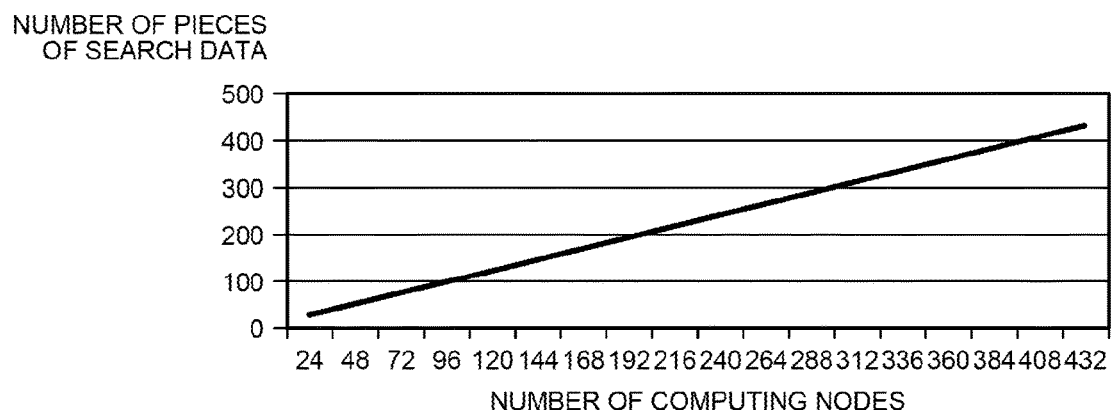
FIG. 22 is a graph for explaining an example of the number of pieces of search data that are output from the management device in the third embodiment.

FIG. 22 is a graph for explaining an example of the number of pieces of search data that are output from the management device in the third embodiment. In FIG. 22, the number of pieces of search data that are output from the management device 10b is plotted while the horizontal axis is set to the number of computing nodes and the vertical axis is set to the number of pieces of search data in the same manner as FIG. 21. For example, as illustrated in FIG. 22, the management device 10b outputs "24" pieces of search data when the number of computing nodes is "24". Furthermore, when the number of computing nodes is "432", the management device 10b outputs "432" pieces of search data. As a result of this, when the number of computing nodes is "432", it is sufficient that the management device 10b searches search data indicating a region optimum for the job assignment from approximately ½₂ pieces of search data in comparison with the related parallel computer system. This enables the management device 10b to shorten the time taken for the job assignment.

Figure 23:
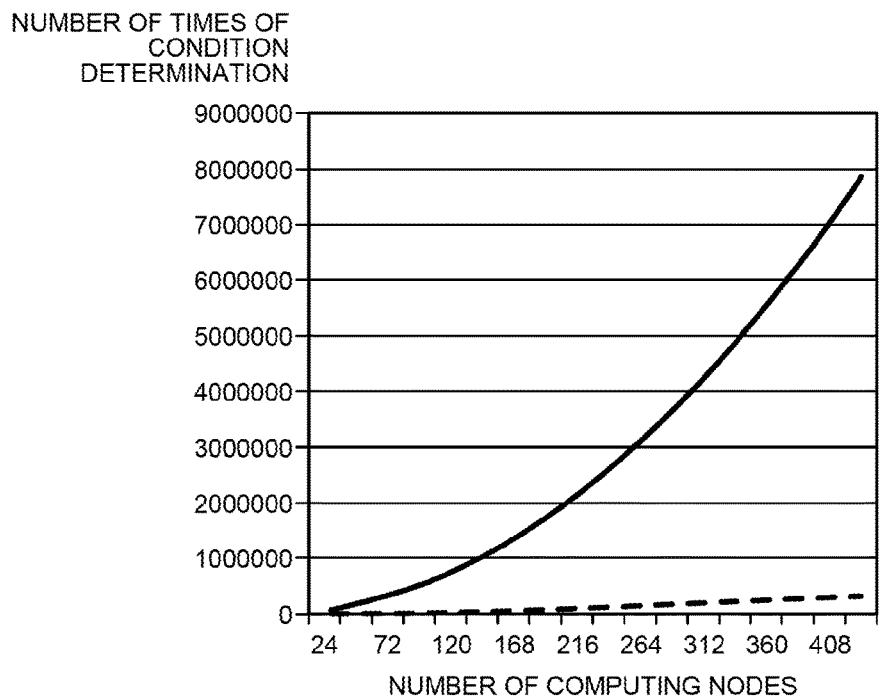
FIG. 23 is a graph for explaining an example of the number of times of condition determination that is executed by the related parallel computer system in consideration of torus in the X axial direction.

Next, the number of times of condition determination processing that is executed by the management device 10b is described with reference to FIG. 23 and FIG. 24. First, an example of the number of times of condition determination that is executed by the related parallel computer when torus in the X axial direction is taken into consideration is described with reference to FIG. 23. FIG. 23 is a graph for explaining an example of the number of times of condition determination that is executed by the related parallel computer when the torus in the X axial direction is taken into consideration.

In FIG. 23, the number of times of condition determination that is executed by the related parallel computer system is plotted by a solid line while the horizontal axis is set to the number of computing nodes and the vertical axis is set to the number of times of condition determination in the same manner as FIG. 12. Furthermore, in FIG. 23, the number of times of condition determination that is executed by the related parallel computer system when the torus in the X axial direction is not taken into consideration is plotted by a dashed line for comparison.

For example, as illustrated in FIG. 23, the related parallel computer system executes the condition determination processing by the number of times obtained by integrating the number of times of condition determination as illustrated in FIG. 12 and the number of computing nodes continuous in the X axial direction. As a result of this, for example, the related parallel computer system executes the condition determination processing by approximately "60552" times when the number of computing nodes is "24". Furthermore, when the number of computing nodes is "432", the parallel computer system executes the condition determination processing by approximately "7875384" times. In this manner, in the related parallel computer, when the number of computing nodes becomes 18-fold, the number of execution times of the condition determination processing is approximately 3121-fold.

Figure 24:
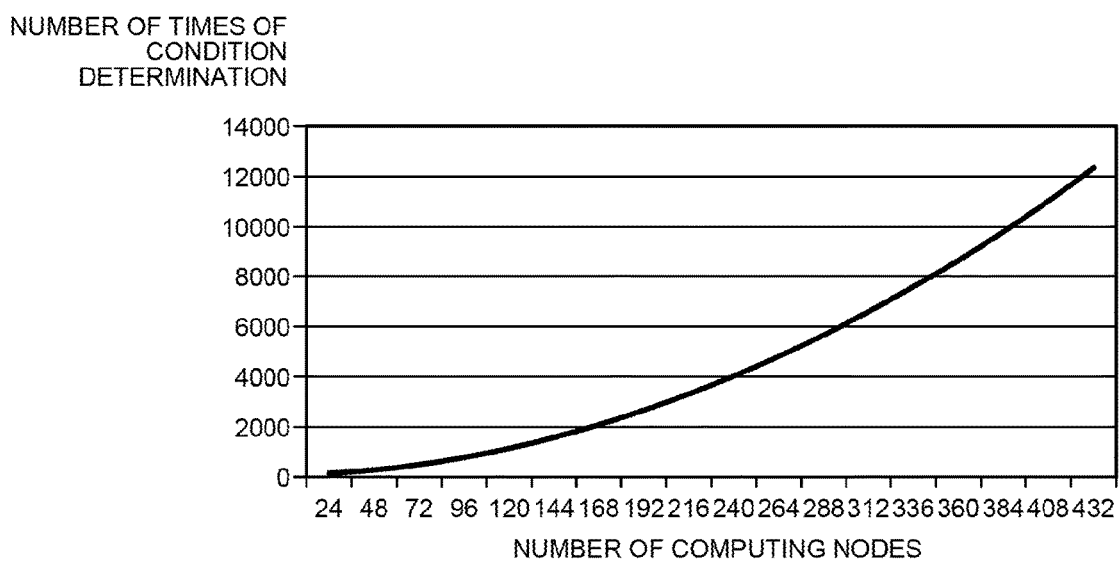
FIG. 24 is a graph for explaining an example of the number of times of condition determination that is executed by the management device in the third embodiment.

FIG. 24 is a graph for explaining an example of the number of times of condition determination that is executed by the management device in the third embodiment. In FIG. 24, the number of times of condition determination that is executed by the management device 10a is plotted while the horizontal axis is set to the number of computing nodes and the vertical axis is set to the number of times of condition determination in the same manner as FIG. 12. For example, as illustrated in FIG. 24, the management device 10a executes the condition determination processing by approximately "75" times when the number of computing nodes is "24". Furthermore, when the number of computing nodes is "432", the management device 10a executes the condition determination processing by approximately "12349" times. In this manner, the management device 10a can search the regions in which the idle nodes are continuous by approximately 1/638 processing in comparison with the related parallel computer system.

Figure 25:
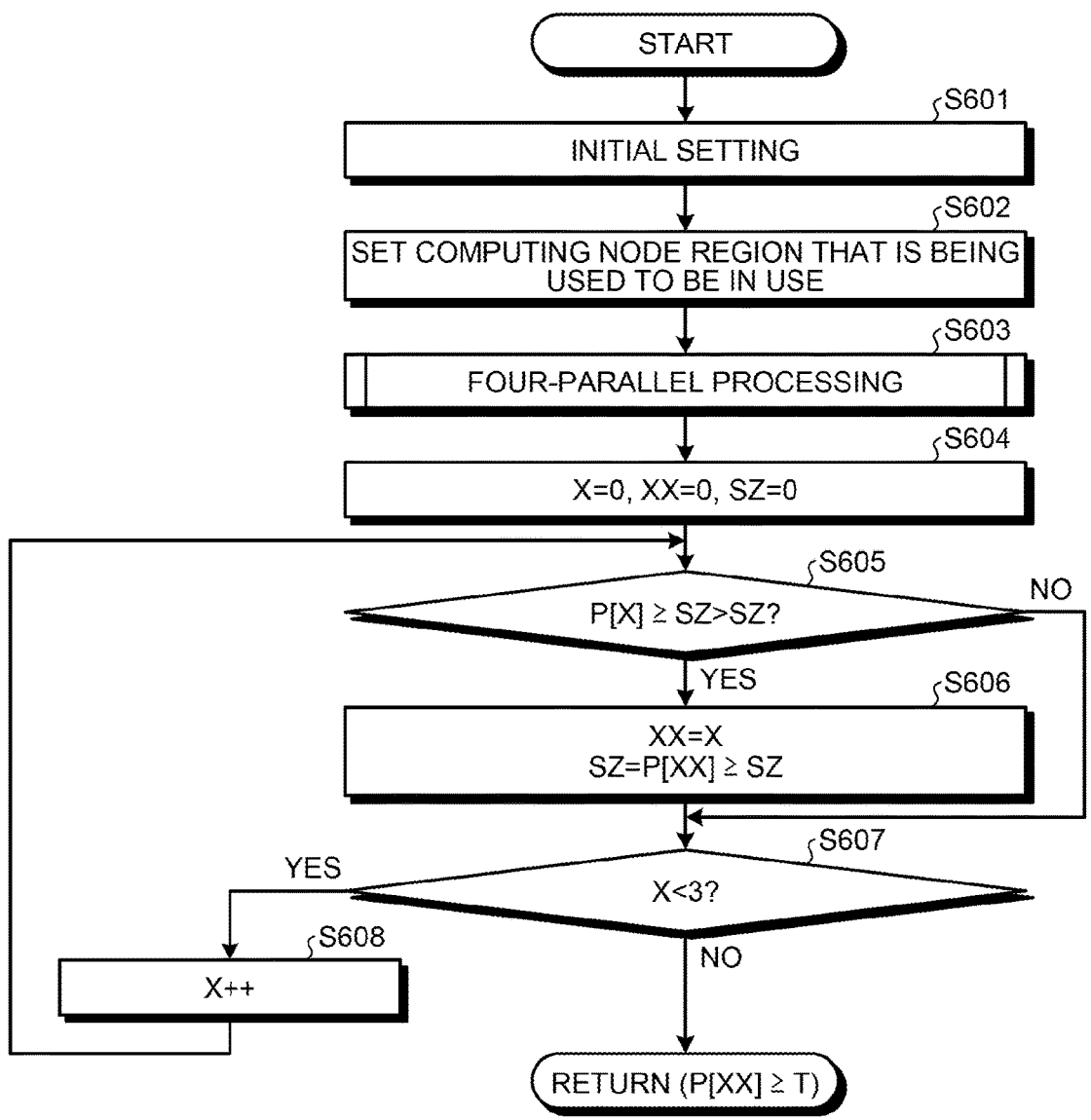
FIG. 25 is a flowchart for explaining the procedure of main processing that is executed by the management device in the third embodiment.
Figure 26:
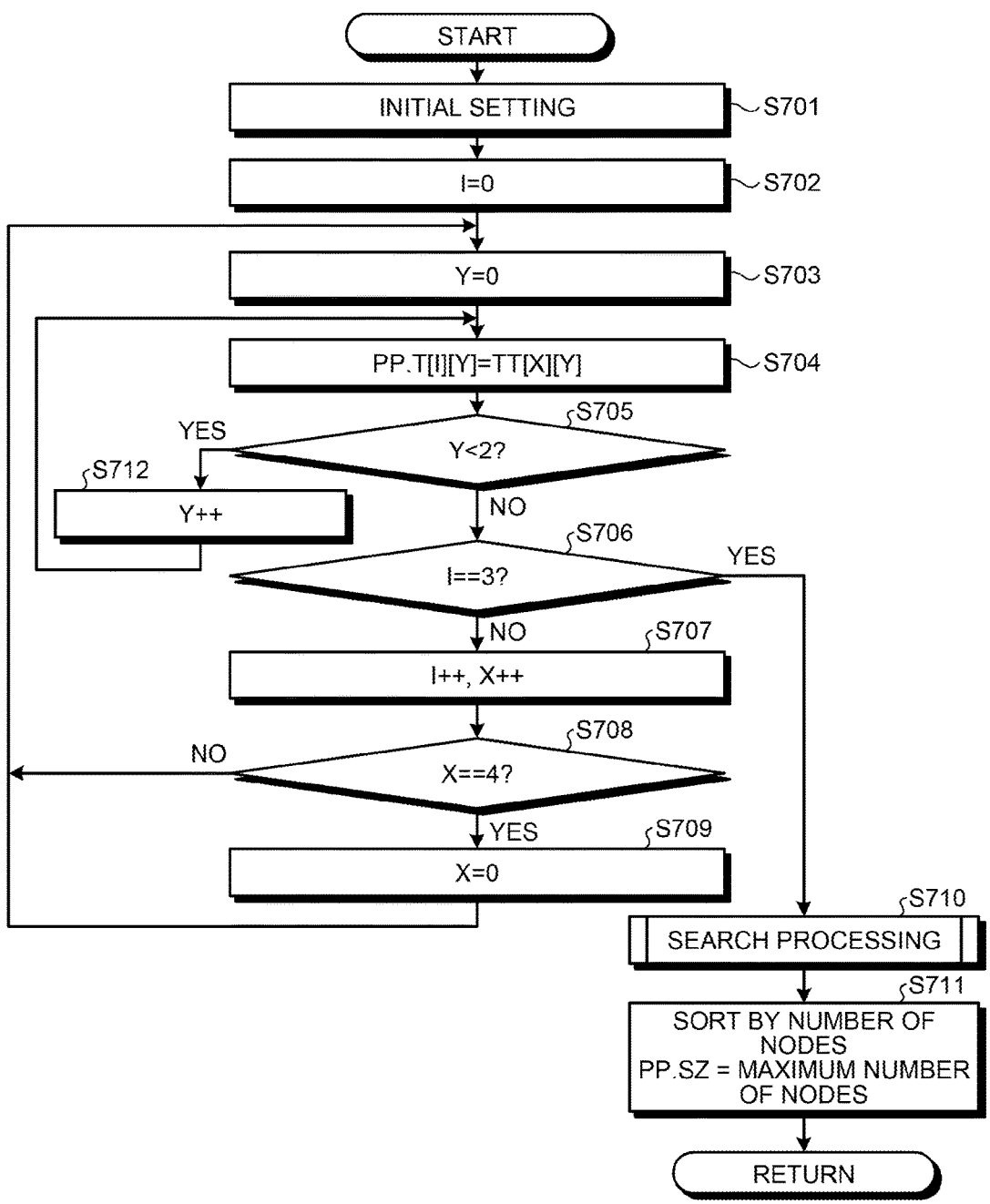
FIG. 26 is a flowchart for explaining the procedure of four-parallel processing that is executed by the management device in the third embodiment.

Next, the procedure of the processing that is executed by the management device 10b is described with reference to FIG. 25 and FIG. 26. First, the basic procedure of the processing that is executed by the management device 10b is described with reference to FIG. 25. FIG. 25 is a flowchart for explaining the procedure of the main processing that is executed by the management device in the third embodiment. In the following description, a cell corresponding to a computing node T[X][Y] among cells in the table generated by the management device 10b is expressed as TT[X][Y]. In addition, in the following description, the size of a region indicated by search data acquired as a result of the parallel processing is referred to as SZ.

First, the management device 10b executes initial setting (step S601). As a detail example thereof is described, the management device 10b generates a table indicating that five computing nodes are arranged in the X axial direction and four computing nodes are arranged in the Y axial direction, and all the computing nodes are set to the idle nodes. The management device 10b stores information indicating that TT[4][0] to TT[4][3] and TT[0][3] to TT[4][3] indicating the virtual computing nodes are being used in the generated table. The management device 10b acquires an acquisition region return pointer array P[4] for parallel processing.

Subsequently, the management device 10b stores information indicating that the computing nodes are being used in regions corresponding to the computing nodes assigned with the job that are being used in the generated table (step S602). Thereafter, the management device 10b executes four-parallel processing (step S603). Thereafter, the management device 10b initializes values of X, XX, and SZ to 0 (step S604). The management device 10b determines whether the SZ value of the array P[X] is larger than the present variable SZ (step S605).

If it is determined that the SZ value of the array P[X] is larger than the present variable SZ (Yes at step S605), the management device 10b sets the XX value to the X value and changes the SZ value to the SZ value of an array P[XX] (step S606). On the other hand, if it is determined that the SZ value of the array P[X] is equal to or smaller than the present variable SZ (No at step S605), the management device 10b skips the processing at step S606.

Subsequently, the management device 10b determines whether the X value is smaller than 3 (step S607). If it is determined that the X value is equal to or larger than 3 (No at step S607), the management device 10b outputs a T value of the array P[XX] and finishes the processing. On the other hand, if it is determined that the X value is smaller than 3 (Yes at step S607), the management device 10b adds 1 to the X value (step S608) and executes step S605.

Next, the procedure of four-parallel processing that is executed by the management device in the third embodiment is described with reference to FIG. 26. FIG. 26 is a flowchart for explaining the procedure of the four-parallel processing that is executed by the management device in the third embodiment. The processing as illustrated in FIG. 26 corresponds to the processing at step S603 in FIG. 25. In the following description, I, X, and Y are set to variables.

First, the management device 10b executes initial setting (step S701). To be specific, the management device 10b acquires a PP.T[5][4] region in which five pieces of data can be aligned in the X axial direction and four pieces of data can be aligned in the Y axial direction. The management device 10b stores information indicating that the job is assigned to the computing nodes in PP.T[4][0] to PP.T[4][3] and PP.T[0][3] to PP.T[4][3] as regions corresponding to the virtual computing nodes among the acquired regions. The management device 10b acquires a PP.SZ region and initializes the P[X] value at an address in which the PP value is stored.

The management device 10b initializes the variable I value to 0 (step S702), initializes the variable Y value to 0 (step S703), and sets the PP.T[I][Y] value to TT[X][Y] (step S704). The management device 10b determines whether the Y value is smaller than 2 (step S705). If the Y value is equal to or larger than 2 (No at step S705), the management device 10b determines whether the I value is equal to 3 (step S706).

If it is determined that the I value is different from 3 (No at step S706), the management device 10b adds 1 to each of the I and X values (step S707), and determines whether the X value is equal to 4 (step S708). If it is determined that the X value is equal to 4 (Yes at step S708), the management device 10b sets the X value to 0 (step S709) and executes step S703.

On the other hand, if it is determined that the I value is equal to 3 (Yes at step S706), the management device 10b executes the search processing and acquires the array PP.T value, that is, pieces of search data (step S710). Thereafter, the management device 10b sorts the list of the pieces of search data acquired as a result of the search processing by the number of computing nodes included in the region, and sets the PP.SZ value to the maximum number of nodes (step S711) and finishes the processing.

On the other hand, if it is determined that the Y value is smaller than 2 (Yes at step S705), the management device 10b adds 1 to the Y value (step S712) and executes step S704. If it is determined that the X value is different from 4 (No at step S708), the management device 10b executes step S703.

Advantageous Effects by Information Processing System 1b

As described above, the computing nodes 3a to 3f of the parallel computer 3 form a torus network in which they are connected in a circular ring form in the predetermined axial direction. The management device 10b sets the respective information processing devices continuous in the predetermined axial direction to the virtual origins, and searches all the regions in which the respective computing nodes 3a to 3f are set to the base points for the respective virtual origins.

Furthermore, the management device 10b compares the size of the region indicated by the first search data in the predetermined axial direction and the size of the region indicated by the second search data as the higher-order search data than the first search data in the predetermined axial direction among the pieces of search data. When the size of the region indicated by the first search data in the predetermined axial direction is equal to or smaller than the size of the region indicated by the second search data in the predetermined axial direction, the management device 10b deletes the search data indicating the first region. This enables the management device 10b to shorten the time taken for the processing of searching a region optimum for the job assignment.

Moreover, the management device 10b includes the plurality of search units 15b to 15e. The management device 10b stores the plurality of node tables 12a and 12b expressing the coordinates at which other computing nodes are arranged while the computing nodes continuous in the predetermined axial direction are set to the virtual origins. The respective search units 15b to 15e select different computing nodes as the virtual origins from the computing nodes continuous in the predetermined axial direction. Thereafter, the respective search units 15b to 15e execute the pieces of processing of searching for regions in which the idle nodes are arranged continuously in parallel, using the node tables in which the selected computing nodes are set to the virtual origins. With this configuration, even when the computing nodes 3a to 3f of the parallel computer 3 form the torus network in which they are connected in a circular ring form in the predetermined axial direction, the management device 10b can shorten the time taken for the job assignment.

[d] Fourth Embodiment

Although the embodiments of the present invention have been described above, the embodiment may be executed in various different modes in addition to the above-mentioned embodiments. The following describes other embodiments encompassed in the invention as the fourth embodiment.

(1) Management Device

The functions of the management device 10, 10a, or 10b in each of the first to the third embodiments described above may be combined arbitrarily. For example, the management device 10b may not use the node table indicating that the job is constantly assigned to the virtual computing nodes arranged at the ends of the network unlike the management device 10.

(2) Computing Node

Although the computing nodes 3a to 3f form the two-dimensional mesh network, the two-dimensional torus network, or the three-dimensional torus network in each of the first to the third embodiments described above, the embodiment is not limited thereto. For example, the computing nodes 3a to 3f may form an arbitrary-dimensional mesh network or an arbitrary-dimensional torus network.

When the computing node 3a to 3f form the arbitrary-dimensional mesh network, the management device 10 or 10a can calculate all the pieces of search data by counting the number of continuous idle nodes in each axial direction while changing the number of continuous idle nodes in another axial direction. Furthermore, the computing node 3a to 3f form the arbitrary-dimensional torus network, the management device 10b generates the node tables for the respective virtual origins in consideration of coming-around in the respective axial directions. The management device 10b can calculate all the pieces of search data by executing the pieces of search processing in parallel using the generated node tables.

(3) Parallel Processing

In the above-mentioned third embodiment, the management device 10b executes the pieces of search processing in parallel using the plurality of search units 15b to 15e. For example, the management device 10b generates the node tables by the number in accordance with the topology of the network formed by the computing nodes 3a to 3f. For this reason, the management device 10b desirably includes the search units by the number that is the same as the number of node tables that are generated. Alternatively, for example, the management device 10b may include the search units by the half-number of the number of node tables that are generated and each of the search units may execute the search processing two times so as to calculate all the pieces of search data.

(4) Program

Figure 27:
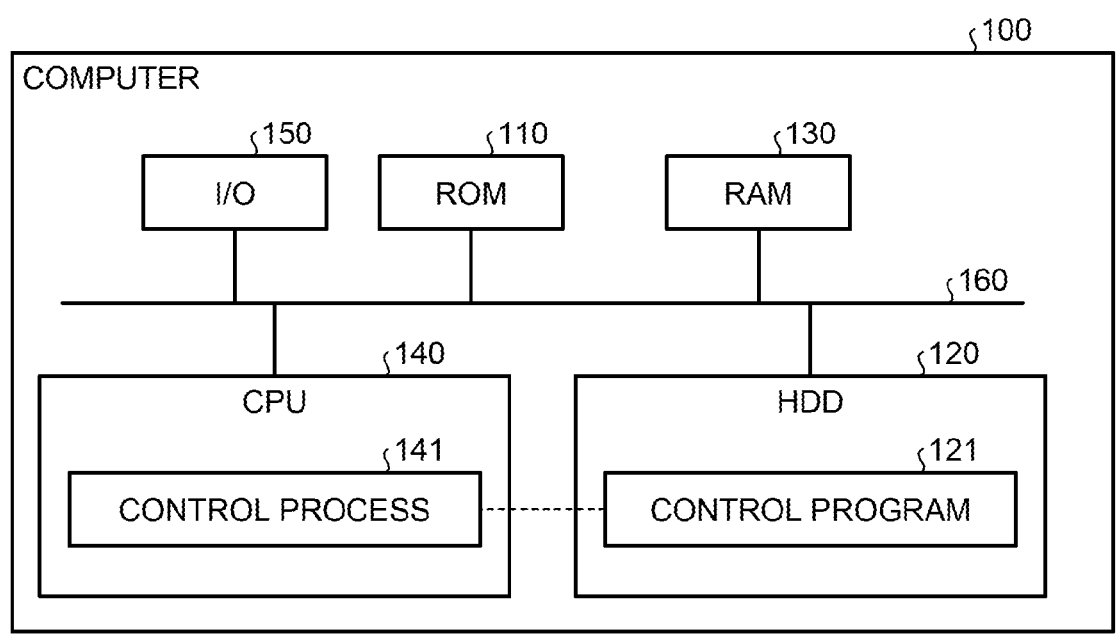
FIG. 27 is a diagram for explaining an example of a computer that executes a control program.
Figure 28:
FIG. 28 is a view for explaining an example of processing of searching idle nodes.

A computer may execute a previously prepared control program so as to execute the functions of the management device 10, 10a, or 10b as described in each of the above-mentioned embodiments. The following describes an example of the computer that executes the control program having the same functions as those of the above-mentioned management device 10, 10a, or 10b with reference to FIG. 27. FIG. 27 is a diagram for explaining the example of the computer that executes the control program.

A computer 100 as illustrated in FIG. 27 includes a read only memory (ROM) 110, a hard disk drive (HDD) 120, a random access memory (RAM) 130, and a central processing unit (CPU) 140 that are connected with a bus 160. Furthermore, the computer 100 as illustrated in FIG. 27 includes an input/output (I/O) 150 for communicating with the parallel computer 3. The I/O 150 is connected to the CPU 140 and the like with the bus 160.

The HDD 120 previously holds a control program 121. The CPU 140 reads out and executes the control program 121 from the HDD 120, so that the control program 121 functions as a control process 141 in the example illustrated in FIG. 27. The control process 141 exhibits the same functions as those of the generator 13, the receiver 14, the search unit 15, the specifying unit 16, and the assignment unit 17 as illustrated in FIG. 1.

The control program described in the embodiment can be executed by executing a previously prepared program on a computer such as a personal computer and a workstation. The program can be distributed via a network such as the Internet. Furthermore, the program is recorded in a computer-readable recording medium such as a hard disc, a flexible disk (FD), a compact disc read only memory (CD-ROM), a magneto optical disc (MO), and a digital versatile disc (DVD). The program can be also executed by being read from the recording medium by the computer.

The computer 100 may execute the control program 121 using an arithmetic device such as a microprocessor unit (MPU) and a field programmable gate array (FPGA) instead of the CPU. In addition, the above-mentioned control program 121 may be stored in the RAM 130 or the ROM 110 or may be executed by the CPU 140 by another method. For example, each program is stored in a "mobile physical medium" such as an FD, a CD-ROM, a DVD, a magneto optical disc, and an integrated circuit (IC) card.

The computer 100 may execute the respective programs by acquiring them from the mobile physical medium. Alternatively, the computer 100 may acquire and execute the respective programs stored in another computer or a server device through a public line, the Internet, a local access network (LAN), a wide area network (WAN), or the like.

According to one embodiment, the present invention can reduce the processing cost when regions including idle nodes are searched.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A parallel computer system comprising:
a parallel computing device including a plurality of information processing devices that are connected to form a two-dimensional mesh network, the information processing device arranged at an end point being set to an origin; and
a management device managing the parallel computing device, the management device includes:
a memory; and
a processor coupled to the memory, the processor executes a process including:
storing therein an assignment table, storing valid bits with each valid bit indicating that a job is assigned to corresponding information processing device when the valid bit is on, including first assignment information for the information processing devices on the two-dimensional mesh network and second assignment information for virtual information processing devices, the virtual information processing devices are arranged at termination ends of the two-dimensional mesh network of the information processing devices against information processing devices arranged on the X-axis or Y-axis, the valid bits of the second assignment information being set on;
executing processing of selecting information processing devices in an order from an information processing device, a connection distance from an information processing device as an origin is maximum toward the information processing device as the origin in a predetermined axial direction while changing a connection distance in another axial direction;
determining whether a job is assigned to the information processing device selected at the executing, using the assignment table;
searching regions in which idle information processing devices assigned with no job are arranged continuously, using the first assignment information and the second assignment information stored in the assignment table;
specifying a region appropriate for assignment of a job as an assignment target among the regions searched by the searching; and
assigning the job to information processing devices included in the region specified by the specifying,
when the determining includes determining that no job is assigned to the selected information processing device, the searching includes searching regions in which the selected information processing device is set to a base point, using a search result of regions in which another information processing device that is connected to the selected information processing device and of which the connection distance from the origin in any axial direction is larger than a connection distance of the selected information processing device is set to a base point.

2. The parallel computer system according to claim 1, wherein the searching includes selecting an information processing device as a base point of the region, counts number of idle information processing devices continuous from the selected information processing device in a predetermined axial direction while changing number of information processing devices continuous in an axial direction other than the predetermined axial direction, and searching idle information processing devices based on the counted result wherein information processing devices are searched from the selected information processing device as a base point using the counted results as an index and the index is in some increments of number of information processing devices.

3. The parallel computer system according to claim 2, wherein when the searching includes changing the number of information processing devices continuous in the axial direction other than the predetermined axial direction and counting the number of idle information processing devices continuous in the predetermined axial direction newly, the searching determines whether the job is assigned to the information processing devices in the predetermined axial direction from the selected information processing device as a base point and the index is incremented toward a number of counted results.

4. The parallel computer system according to claim 1, wherein when the searching includes searching for a region of which the connection distance in a first axial direction is 1 among the regions in which the selected information processing device is set to the base point, the searching includes setting, to a connection distance of the region as a search target in a second axial direction, a value obtained by adding 1 to a connection distance of a region in a second axial direction of which the connection distance in the first axial direction is 1 among regions in which an information processing device connected to the selected information processing device in the second axial direction is set to a base point.

5. The parallel computer system according to claim 1, wherein when the searching includes searching for a region of which the connection distance in a first axial direction is equal to or larger than 2 among the regions in which the selected information processing device is set to the base point, the searching includes setting, to a connection distance of the region as a search target in a second axial direction, a connection distance that is a smaller value between a value obtained by adding 1 to a connection distance of a region in the second axial direction of which the connection distance in the first axial direction is the same as a connection distance of the region as the search target in the first axial direction among regions in which an information processing device connected to the selected information processing device in the second axial direction is set to a base point and a value of a connection distance of a region in the second axial direction of which the connection distance in the first axial direction is a value obtained by subtracting 1 from the connection distance of the region as the search target in the first axial direction among regions in which an information processing device connected to the selected information processing device in the first axial direction is set to a base point.

6. The parallel computer system according to claim 1, wherein
the information processing devices form a torus network in which the information processing devices are connected in a circular ring form in a predetermined axial direction,
the searching includes setting respective information processing devices continuous in the predetermine axial direction to virtual origins and searching all the regions in which the respective information processing devices are set to base points for the respective virtual origins, and
when a connection distance of a first region in a predetermined axial direction is equal to or smaller than a connection distance of a second region in the predetermined axial direction of which the connection distance in an axial direction other than the predetermined axial direction is larger than a connection distance of the first region in a search result at the searching, the specifying includes excluding the first region from the search result.

7. A parallel computer system, comprising:
a parallel computing device including a plurality of information processing devices that are connected to form a torus network in which the information processing devices are connected in a circular ring form in a predetermined axial direction; and
a management device managing the parallel computing device, the management device includes:
a memory; and
a processor coupled to the memory, the processor executes a process including:
storing therein an assignment table, storing valid bits with each valid bit indicating that a job is assigned to corresponding information processing device when the valid bit is on, including first assignment information for the information processing devices on the two-dimensional mesh network and second assignment information for virtual information processing devices, the virtual information processing devices are arranged at termination ends of the two-dimensional mesh network of the information processing devices against information processing devices arranged on the X-axis or Y-axis, the valid bits of the second assignment information being set on;
searching regions in which idle information processing devices assigned with no job are arranged continuously, using the first assignment information and the second assignment information stored in the assignment table;
specifying a region appropriate for assignment of a job as an assignment target among the regions searched by the searching; and
assigning the job to information processing devices included in the region specified by the specifying,
the storing includes storing therein a plurality of assignment tables in which the respective information processing devices continuous in the predetermined axial direction are set to virtual origins, and
the searching includes selecting different information processing devices as the virtual origins from the information processing devices continuous in the predetermined axial direction, and executing pieces of processing of searching for regions in which the idle information processing devices are arranged continuously in parallel, using the assignment tables in which the selected information processing devices are set to the virtual origins.

8. A non-transitory computer-readable recording medium having stored therein a program for a management device managing a parallel computing device including a plurality of information processing devices that are connected to form a two-dimensional mesh network, the information processing device arranged at an end point being set to an origin, the program causing a computer to execute a management device control process comprising:
searching for regions in which idle information processing devices assigned with no job are arranged continuously, using an assignment table, storing valid bits with each valid bit indicating that a job is assigned to a corresponding information processing device when the valid bit is on, including first assignment information for the information processing devices on the two-dimensional mesh network and second assignment information for virtual information processing devices, the virtual information processing devices are arranged at termination ends of the two-dimensional mesh network of the information processing devices against information processing devices arranged on the X-axis or Y-axis, the valid bits of the second assignment information being set on;
executing processing of selecting information processing devices in an order from an information processing device, a connection distance from an information processing device as an origin is maximum toward the information processing device as the origin in a predetermined axial direction while changing a connection distance in another axial direction;
determining whether a job is assigned to the information processing device selected at the executing, using the assignment table;
specifying a region appropriate for assignment of a job as an assignment target among the searched regions; and
assigning the job to information processing devices included in the specified region,
when the determining includes determining that no job is assigned to the selected information processing device, the searching includes searching regions in which the selected information processing device is set to a base point, using a search result of regions in which another information processing device that is connected to the selected information processing device and of which the connection distance from the origin in any axial direction is larger than a connection distance of the selected information processing device is set to a base point.

* * * * *